United States Patent
Lu et al.

(10) Patent No.: US 10,804,522 B2
(45) Date of Patent: Oct. 13, 2020

(54) SINGLE-CELL BATTERY, BATTERY MODULE, POWER BATTERY, AND ELECTRIC VEHICLE

(71) Applicant: BYD COMPANY LIMITED, Shenzhen, Guangdong (CN)

(72) Inventors: Peng Lu, Shenzhen (CN); Luxia Jiang, Shenzhen (CN); Shichao Hu, Shenzhen (CN); Jianhua Zhu, Shenzhen (CN); Yan Zhu, Shenzhen (CN)

(73) Assignee: BYD COMPANY LIMITED, Shenzhen (CN)

(*) Notice: Subject to any disclaimer, the term of this patent is extended or adjusted under 35 U.S.C. 154(b) by 106 days.

(21) Appl. No.: 16/110,548

(22) Filed: Aug. 23, 2018

(65) Prior Publication Data
US 2018/0366715 A1    Dec. 20, 2018

Related U.S. Application Data
(63) Continuation of application No. PCT/CN2016/097405, filed on Aug. 30, 2016.

(30) Foreign Application Priority Data
Feb. 25, 2016    (CN) .......................... 2016 1 0104652

(51) Int. Cl.
    *H01M 2/34*      (2006.01)
    *B60L 50/64*      (2019.01)
    (Continued)

(52) U.S. Cl.
CPC ............ *H01M 2/345* (2013.01); *B60L 50/64* (2019.02); *H01M 2/043* (2013.01); *H01M 2/26* (2013.01);
(Continued)

(58) Field of Classification Search
CPC ................................ H01M 2/34; H01M 2/345
(Continued)

(56) References Cited

U.S. PATENT DOCUMENTS

| | | | | |
|---|---|---|---|---|
| 8,932,749 B2 * | 1/2015 | Lim | .................... | H01M 2/1061 429/120 |
| 2003/0143460 A1 * | 7/2003 | Yoshida | .................. | H01M 2/06 429/181 |

(Continued)

FOREIGN PATENT DOCUMENTS

| CN | 2881974 Y | 3/2007 |
|---|---|---|
| CN | 201490240 U | 5/2010 |

(Continued)

OTHER PUBLICATIONS

Korean Office Action for Application No. 10-2018-7026614, dated Oct. 16, 2019, 6 pages (translated).

(Continued)

*Primary Examiner* — James M Erwin

(57) ABSTRACT

The present disclosure discloses a single-cell battery, a battery module, a power battery, and an electric vehicle. The single-cell battery includes a case, a battery cell accommodated in the case, an electrode terminal electrically connected to the battery cell, and a cover plate for sealing the case. The electrode terminal is disposed on the cover plate. The electrode terminal includes a battery post passing through the cover plate and electrically connected to the battery cell with an internal guide member. The single-cell battery further includes a current interruption device mounted on the battery post. The current interruption device includes a flipping member in communication with gas inside the case. The flipping member is connected to an outer (Continued)

end surface of the battery post with a connection point. The connection point is configured to be disconnected under action of air pressure.

20 Claims, 14 Drawing Sheets

(51) Int. Cl.
  *H01M 2/04* (2006.01)
  *H01M 2/26* (2006.01)
  *H01M 2/12* (2006.01)
(52) U.S. Cl.
  CPC ............ *H01M 2/34* (2013.01); *B60Y 2200/91* (2013.01); *B60Y 2400/112* (2013.01); *H01M 2/1241* (2013.01); *H01M 2200/20* (2013.01); *H01M 2220/20* (2013.01)
(58) Field of Classification Search
  USPC ........................................................ 429/61
  See application file for complete search history.

(56) References Cited

U.S. PATENT DOCUMENTS

| | | |
|---|---|---|
| 2011/0268999 A1 | 11/2011 | Nagai |
| 2012/0114979 A1 | 5/2012 | Kim et al. |
| 2014/0106210 A1 | 4/2014 | Deng et al. |
| 2015/0093612 A1 | 4/2015 | Okuno |
| 2015/0171411 A1 | 6/2015 | Kobayashi et al. |
| 2015/0188119 A1 | 7/2015 | Gao |
| 2015/0243961 A1* | 8/2015 | Urano ................... H01M 2/06 429/61 |

FOREIGN PATENT DOCUMENTS

| | | |
|---|---|---|
| CN | 201508864 U | 6/2010 |
| CN | 201623187 U | 11/2010 |
| CN | 202749424 U | 2/2013 |
| CN | 203733907 U | 7/2014 |
| CN | 203743429 | 7/2014 |
| CN | 204348811 U | 5/2015 |
| CN | 204632818 | 9/2015 |
| JP | H9-199105 | 7/1997 |
| JP | H11-224658 | 8/1999 |
| JP | 2000-149918 | 5/2000 |
| JP | H11-260345 | 3/2001 |
| JP | 2004273139 A | 9/2004 |
| JP | 2014-137891 | 7/2014 |
| JP | 2014-523075 | 9/2014 |
| JP | 2015-069945 | 4/2015 |
| KR | 10-1058386 | 2/2011 |
| KR | 20140025583 | 3/2014 |
| WO | 2010/146701 | 11/2012 |
| WO | 2013/164897 | 12/2015 |

OTHER PUBLICATIONS

Japanese Office Action for Application No. 2018-541196, dated Sep. 10, 2019, 14 pages (translated).
International Search Report and Written Opinion for Application No. PCT/CN2016/097405, dated Nov. 10, 2016, 8 pages.

* cited by examiner

SINGLE-CELL BATTERY, BATTERY MODULE, POWER BATTERY, AND ELECTRIC VEHICLE

CROSS-REFERENCE TO RELATED APPLICATIONS

This application is a continuation application of International Application No. PCT/CN2016/097405, filed on Aug. 30, 2016, which is based on and claims priority to and benefits of Chinese Patent Application No. 201610104652.9, filed with the State Intellectual Property Office (SIPO) of the People's Republic China on Feb. 25, 2016. The entire contents of the above-identified applications are incorporated herein by reference.

TECHNICAL FIELD

The present disclosure relates to the field of batteries, and in particular, to a single-cell battery, a battery module including the single-cell battery, a power battery including the battery module, and an electric vehicle including the power battery.

BACKGROUND

As energy storage units, batteries play an important role in various industries. For example, power batteries are widely applied in fields such as new energy vehicles. In a battery pack of a power battery, multiple single-cell batteries may be connected in series or in parallel to form a battery module, to implement a charge/discharge operation. The power battery usually uses a battery management system (BMS) to monitor a voltage change and a current change and calculate a state of charge in the charge/discharge process. However, a voltage sampling failure may lead to overcharging of the battery. Particularly, in a ternary system, there is a danger of battery burning or explosion if the overcharging reaches a certain amount.

In the existing technical solution, during monitoring of a battery voltage and current, a current integration method and an open circuit voltage method are used to calculate a battery level, to control battery charge/discharge management. However, there are disadvantages. For example, because of a battery voltage sampling failure, a battery current sampling failure, or a software failure, a battery is recharged for a long time and out of control. Particularly, in a case of recharging by using a charging pile, overcharging cannot be controlled if the charging pile fails to communicate with a battery manager, and when the overcharging reaches a certain amount, battery swelling and even explosions or fires are caused.

Therefore, it is of positive significance to provide a current interrupt technology for proactively and forcibly interrupting a current.

SUMMARY

An objective of the present disclosure is to provide a single-cell battery. The single-cell battery has an ingenious structure and can forcibly interrupt a current when in danger, thereby preventing a danger such as a battery explosion from occurring.

The objective of the present disclosure is to further provide a battery module using the single-cell battery, a power battery using the battery module, and an electric vehicle using the power battery.

To achieve the foregoing objectives, the present disclosure provides a single-cell battery. The single-cell battery includes a case, a battery cell accommodated in the case, an electrode terminal electrically connected to the battery cell, and a cover plate for sealing the case. The electrode terminal is disposed on the cover plate. The electrode terminal includes a battery post passing through the cover plate and electrically connected to the battery cell by using an internal guide member. The single-cell battery further includes a current interruption device mounted on the battery post. The current interruption device has a flipping member in communication with gas inside the case. The flipping member is connected to an outer end surface of the battery post by using a connection point. The connection point can be disconnected under action of air pressure.

Preferably, the flipping member is connected to the battery post by using a single welding spot.

Preferably, the battery post includes an air-guide hole in communication with the inner part of the case.

Preferably, the flipping member includes a notch. The notch is disposed surrounding the connection point.

Preferably, the connection point can be pulled apart under action of first air pressure inside the case, the notch can be pulled apart under action of second air pressure, and the second air pressure is greater than the first air pressure.

Preferably, the flipping member is covered by a covering cap, and the covering cap includes an air hole.

Preferably, a first ceramic ring is connected between the battery post and the cover plate.

Preferably, a second ceramic ring is tightly connected between the battery post and an outer periphery of the flipping member.

Preferably, the battery post has an annular boss surrounding the connection point. The first ceramic ring is tightly accommodated in a rear concave portion of the annular boss. The first ceramic ring is tightly connected to the cover plate. A radial outer side of the annular boss tightly supports the second ceramic ring. The second ceramic ring tightly supports the outer periphery of the flipping member.

Preferably, the first ceramic ring is tightly connected to the cover plate by using a transition ring.

The present disclosure further provides a battery module. The battery module includes the single-cell battery according to the present disclosure.

The present disclosure further provides a power battery, including an inclusion body and a battery module disposed inside the inclusion body. The battery module is the battery module according to the present disclosure.

The present disclosure further provides an electric vehicle. The electric vehicle includes the power battery according to the present disclosure.

In the foregoing technical solution, a gas may be produced when the battery is in an emergency case. Therefore, as the air pressure increases, a flipping member can flip over under action of the air pressure, to disconnect from the battery post, thereby disconnecting the charge/discharge circuit of the power battery, and further avoiding a further increase in the battery air pressure and explosions.

Other features and advantages of the present disclosure are to be described in detail in the following part of detailed description.

BRIEF DESCRIPTION OF THE DRAWINGS

The accompanying drawings are used to provide a further understanding of the present disclosure, and constitute a part of the specification, which are used to explain the present disclosure in combination with the following specific implementations, and do not constitute a limitation to the present disclosure. In the accompanying drawings.

DETAILED DESCRIPTION

Figure 1:
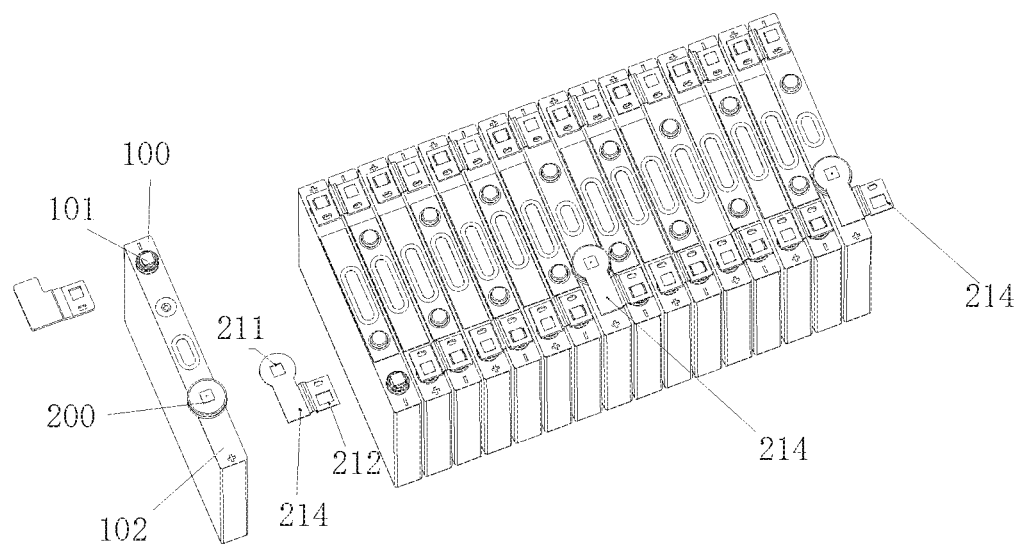
FIG. 1 is a partial exploded three-dimensional schematic diagram of a power battery according to an embodiment of the present disclosure.

The following describes in detail specific embodiments of the present disclosure with reference to the accompanying drawings. It should be understood that the specific embodiments herein are used merely for describing the present disclosure and are not intended to limit the present disclosure.

Unless otherwise specified, nouns of locations such as "up, down, left, and right" used in the present disclosure are generally defined based on figure plane directions of corresponding accompanying drawings, and "inside and outside" refers to an inner part and an outer part of a corresponding component.

The present disclosure provides technical solutions of a current interruption device, a single-cell battery, a battery module, a power battery, and an electric vehicle. The current interruption device is disposed inside the single-cell battery. Multiple single-cell batteries are connected in series or in parallel to form the battery module and may be placed inside a battery pack to form the power battery. Moreover, in addition to the field of power batteries, various technical solutions provided in the present disclosure may be further widely applied to other battery fields. Specifically, the present disclosure relates to single-cell batteries 100, 1100, 2100, 3100, and 4100, and relates to current interruption devices 200, 1200, 3200, 4200, and an explosion relief valve 2200. In addition, the present disclosure further relates to a charge/discharge protection system having the power battery. The following describes the embodiments in detail with reference to the accompanying drawings.

First, the present disclosure provides a battery module, including the multiple single-cell batteries 100, 1100, 2100, 3100, and 4100. The single-cell battery may include a case, a battery cell accommodated in the case, electrode terminals 101, 1101, 2101, 3101, and 4101 electrically connected to the battery cell, and cover plates 102, 1102, 2102, 3102, and 4102 for sealing the case. The electrode terminal is disposed on the cover plate, to input and output currents. The single-cell battery includes the current interruption devices 200, 1200, 3200, and 4200 or the explosion relief valve 2200. The current interruption device or the explosion relief valve is electrically connected to the electrode terminal. Therefore, input and output of currents on the electrode terminal can be controlled under action of the current interruption device. That is, for the current interruption device or the explosion relief valve in the single-cell battery is normally connected to the battery cell. In this case, the electrode terminal can normally input and output currents, to complete a charge/discharge operation of the single-cell battery. However, in an emergency state, for example, when the battery is overcharged, the current interruption device or the explosion relief valve may stop the current input and output of the electrode terminal, to prevent the battery from being recharged at an excessive rate. Therefore, reliability of the current interruption device is crucial as an important safety measure. That is, the current interruption device needs to be capable of making a quick response. Moreover, the current interruption device or the explosion relief valve may alternatively be fixed relative to the cover plate. That is, the current interruption device or the explosion relief valve may be directly fixed to the cover plate, or may be fixed to any component connected to the cover plate or fixed relative to the cover plate. For example, the current interruption device or the explosion relief valve is mounted on the electrode terminal in the cover plate.

In the present disclosure, the current interruption device or the explosion relief valve each is a mechanical structure for sensing the air pressure. Specifically, the current interruption device is in communication with gas inside the case of the single-cell battery, and can interrupt, under action of the air pressure, a current passing through the current interruption device. Specifically, connections between internal components may be disconnected to stop current transmission, thereby stopping charging/discharging of the battery in a timely manner. A source of the air pressure used is: for example, when an emergency case such as overcharging of the battery occurs, a gas is produced inside the battery, then leading to an increase in the air pressure inside the case, or an exception occurs in the battery during use, causing an increase in the temperature of the battery and an increase in the air pressure inside the battery, thereby generating air pressure power for driving the current interruption device or the explosion relief valve.

FIG. 1 to FIG. 12 provide some embodiments. As shown in FIG. 3 to FIG. 6, FIG. 8, and FIG. 10, the current interruption device 200 has a conductive member 201 and a flipping member 202 electrically connected to the conductive member 201. The flipping member 202 and the conductive member 201 can be electrically disconnected from each other under action of air pressure. In the present disclosure, electrical disconnection may be implemented in different manners. A connection point between may be disconnected. For example, a welding spot between the conductive member and the flipping member is removed to implement the electrical disconnection. Alternatively, at least one of the conductive member and the flipping member is broken. For example, a weakening notch is made in a corresponding component to implement disconnection of a structure, thereby implementing the electrical disconnection. That is, an objective of stopping current transmission by disconnecting a mechanical structure under action of the air pressure is achieved in the present disclosure.

In this way, for example, when the battery is overcharged, a gap is produced inside the battery and then the air pressure increases. In this case, the flipping member 202 is disconnected from the conductive member 201 by performing a flipping action, so that a circuit between the electrode terminal 101 and the outside is disconnected, and charging of the battery is stopped, thereby avoiding a further increase in the air pressure inside the battery, and ensuring battery safety.

The electrode terminal 101 includes a battery post 104 electrically connected to the battery cell. For example, the battery post 104 is connected to the battery cell by using an internal guide member. The battery post 104 passes through the cover plate 102 to guide a current from the case. The current interruption device 200 is mounted on the battery post 104. In this way, the air pressure inside the battery may be detected by using the battery post 104, so that the sensitivity is high. Moreover, the current interruption device 200 does not need to be connected to the electrode terminal additionally, thereby facilitating processing.

Figure 5:
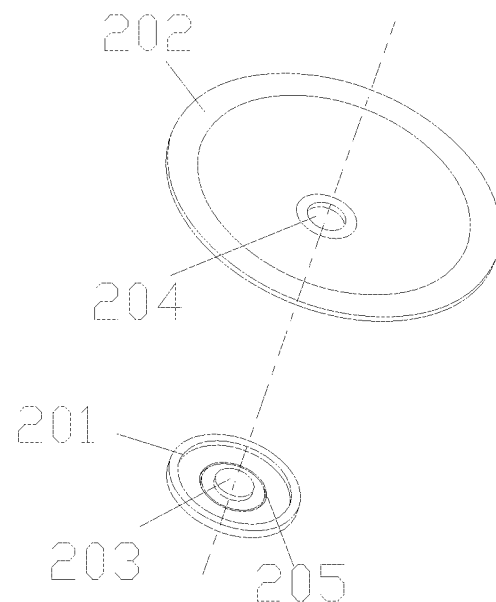
FIG. 5 is an exploded schematic structural diagram of a flipping member and a conductive member according to an embodiment of the present disclosure.
Figure 6:
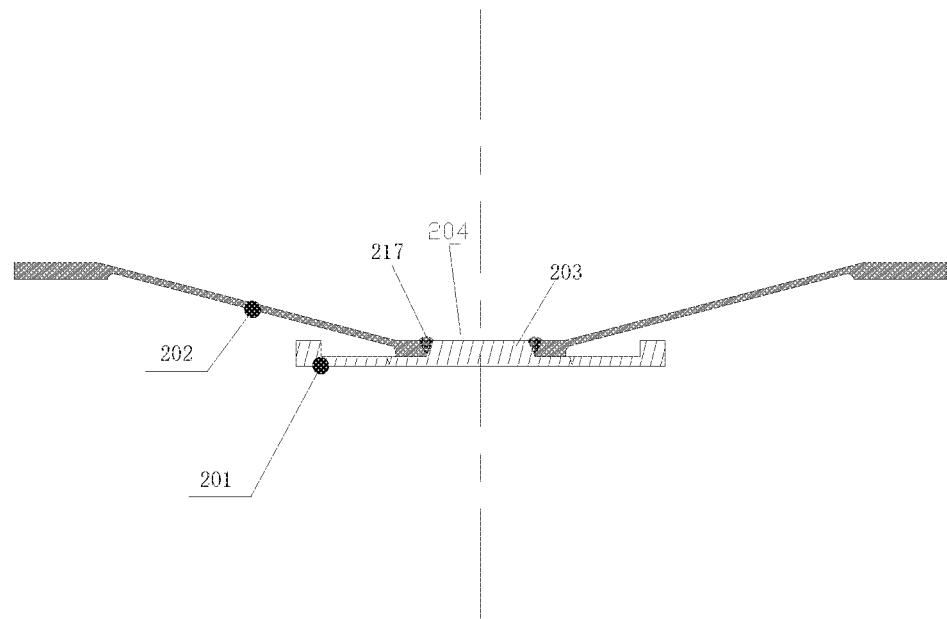
FIG. 6 is a schematic structural sectional view of a flipping member and a conductive member in an assembled state according to an embodiment.

In a field such as the field of power batteries, a high current needs to pass. Therefore, stability of a welded structure of the conductive member 201 and the flipping member 202 needs to be ensured, to prevent the high current from breaking the welded structure. In this way, in an embodiment, as shown in FIG. 5 and FIG. 6, the flipping member 202 and the conductive member 201 are connected to each other by using a boss welded structure. The boss welded structure includes a boss 203, a connection hole 204 accommodating the boss 203, and an annular welding spot 217 located between the boss 203 and the connection hole 204. Therefore, it can be ensured that the annular welding spot 217 is used to firmly weld the boss 203 accommodated in the connection hole 204, and a passing area of the current can be increased to ensure passing of the high current. Specifically, the boss 203 is formed in the conductive member 201, and the connection hole 204 is formed in the flipping member 202. More specifically, the flipping member 202 is formed with a first sheet-like structure, the first sheet-like structure includes the connection hole 204, the conductive member 201 is formed with a second sheet-like structure, and the second sheet-like structure includes the boss 203. In another embodiment, alternatively, the boss 203 may be disposed on the flipping member 202, and the connection hole 204 is disposed in the conductive member 201. Moreover, in some embodiments, the flipping member 202 and the conductive member 201 may be alternatively welded together by using a laser penetration welding manner, or the like.

The flipping member and the conductive member may be electrically disconnected from each other by using a notch. That is, a weakening portion with strength less than that of a weakening portion in another region is provided in a corresponding part. In order that the conductive member and the flipping member are completely disconnected from each other, the notch is usually an annular structure surrounding a connection point between the conductive member and the flipping member, for example, the boss welded structure. In this way, electrical disconnection is implemented with disconnection of the conductive member or the flipping member. The notch may be formed in the flipping member or may formed in the conductive member. In an embodiment, the conductive member 201 includes a notch 205. The notch 205 is surrounding a connection point for connecting to the flipping member 202. That is, an annular notch is disposed in the conductive member 201 and surrounding the boss 203. In this way, when the air pressure inside the battery increases, the notch 205 may be pulled apart under action of the air pressure, so that the part of the boss 203 surrounded by the notch 205 is separated from the conductive member 201 with the flipping member 202, thereby implementing interruption of the current. In another implementation, alternatively, the notch may be formed in the flipping member 202.

Figure 7:
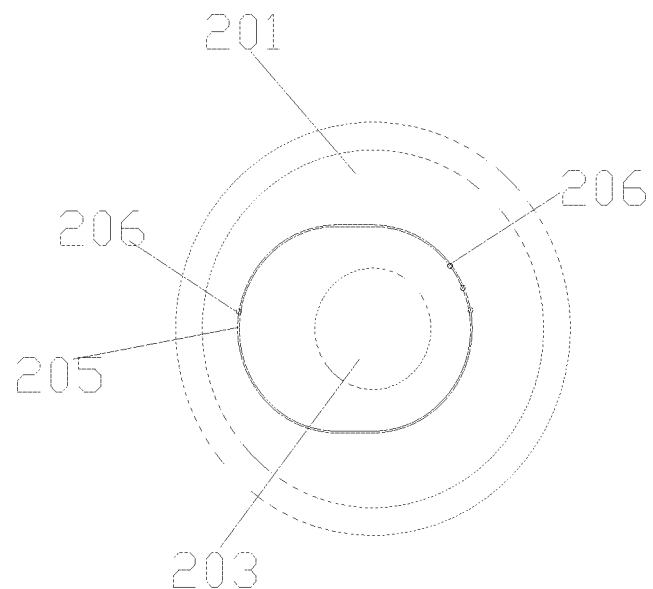
FIG. 7 is a schematic structural top view of a conductive member according to an embodiment of the present disclosure.

As shown in FIG. 7, to help pulling the notch 205 apart, preferably, the notch 205 is elliptical. In this way, under action of the air pressure, because of different contour curvature, stress is more easily concentrated in a region with a greater curvature and the received force is strong. In this way, such a region can be first torn, thereby increasing sensitivity in pulling the notch 205 apart. Further, in this embodiment, the boss 203 is circular, and a center of the elliptical notch 205 and a center of the boss 203 are staggered a long a direction of major axis of the ellipse. In this way, regions at two ends of the major axis of the ellipse may receive uneven force, so that the notch 205 is easily pulled apart at a local point, thereby improving sensitivity of the notch 205.

Moreover, the flipping member 202 and the electrode terminal 101 may be coaxially disposed, and the conductive member 201 is obliquely disposed relative to an axial line of the electrode terminal 101. In this way, a notch at a lower location may be first pulled apart, thereby increasing sensitivity in pulling the notch 205 apart. Further, when the notch 205 is elliptical, in a design, the major axis of the ellipse and the axial line of the conductive member are obliquely disposed. When the conductive member is mounted on the battery post, the conductive member and an axial line of the battery post are also obliquely disposed. In this way, a region with greater curvature on an end portion of the major axis is first and easily torn, thereby ensuring that the notch 205 can be normally pulled apart when needed, and ensuring normal operation of the current interruption device 200.

Moreover, to further ensuring that the notch 205 is pulled apart, alternatively, as shown in FIG. 7, in a design, the notch 205 includes a weakening hole 206. In this way, the notch 205 is easily pulled apart at a location of the weakening hole 206. A size of the weakening hole 206 and a quantity of weakening holes 206 may be set according to an actual situation. Preferably, there are multiple weakening holes 206 disposed at intervals along the notch 205. In addition to the effect of weakening, when the notch is designed in the conductive member 201, the weakening hole 206 may be further used for air guiding, so that the gas inside the battery can apply the air pressure to the flipping member 202 by using the weakening hole 206.

Figure 3:
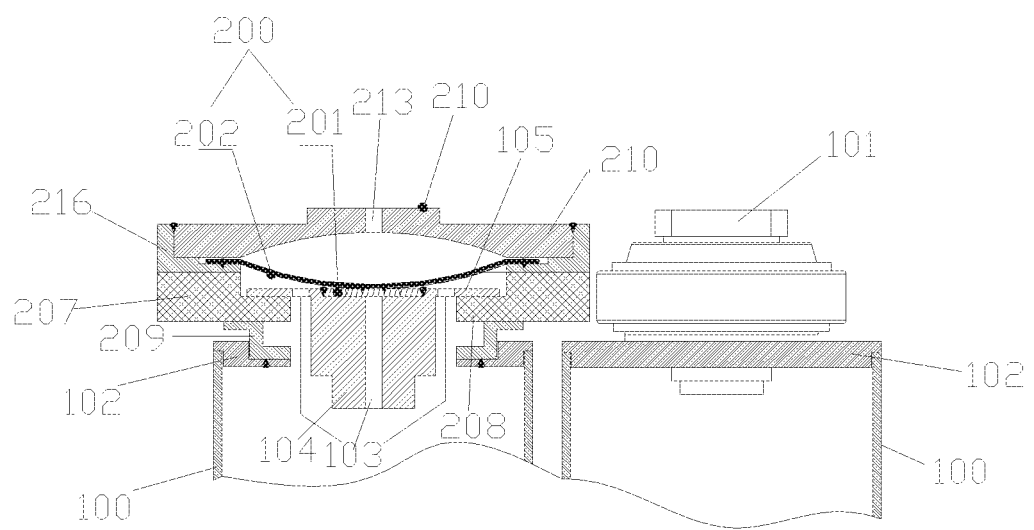
FIG. 3 is a schematic structural sectional view along line A-A in FIG. 2.
Figure 4:
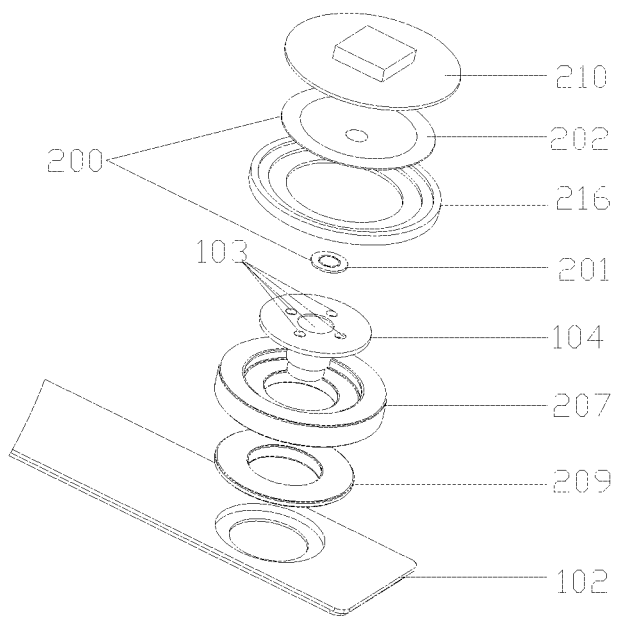
FIG. 4 is an exploded schematic structural diagram of a current interruption device according to an embodiment of the present disclosure.
Figure 8:
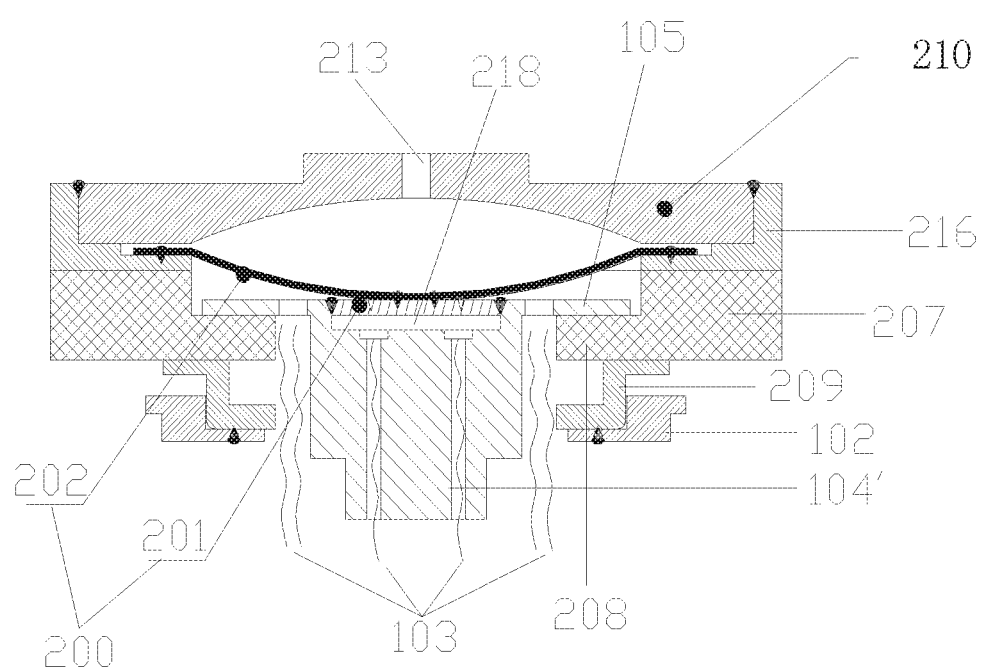
FIG. 8 is a schematic structural sectional view of a battery post and a ceramic ring according to an embodiment of the present disclosure.
Figure 10:
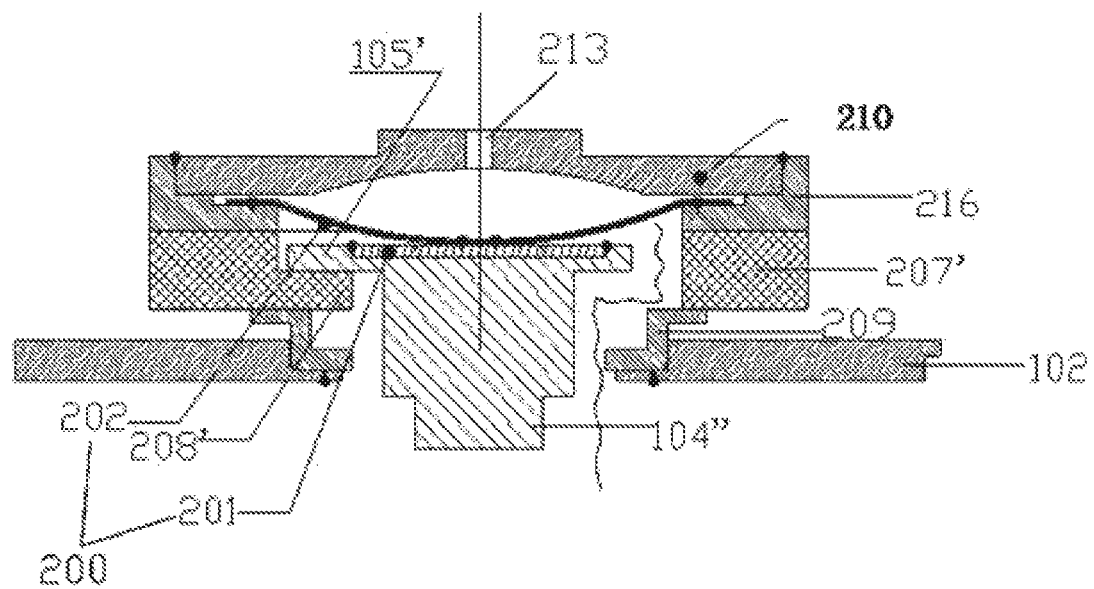
FIG. 10 is a schematic structural sectional view of a battery post and a ceramic ring according to an embodiment of the present disclosure.

As shown in FIG. 3, FIG. 8, and FIG. 10, when the current interruption device 200 is mounted on the battery posts 104, 104', and 104", the conductive member 201 is connected to outer end surfaces of the battery posts 104, 104', and 104", and an outer periphery of the flipping member 202 is fixed relative to the cover plate 102. In this way, under action of air pressure, the outer periphery of the flipping member 202 is used as a support point, and the notch 205 formed in the conductive member 201 can be pulled apart. Moreover, to enable the flipping member 202 to be under action of the air pressure, the outer periphery of the flipping member may be sealed, for example, may be tightly connected to the cover plate with welding, to that the internal air pressure can apply force to the flipping member to pull the notch 205 apart. Herein and in similar descriptions, an outer end or an inner end is defined relative to the case along an axial direction of the battery post, and the "inside and outside" relative to an annular member, for example, the outer periphery, is defined relative to a center of the annular member along the radial direction.

To ensure that the notch 205 in the conductive member 201 can still be pulled apart when the conductive member 201 and the battery post 104' are fixed, preferably, the outer end surface of the battery post 104 includes an accommodation hole 218, and an outer periphery of the conductive member 201 is fixed to an inner wall of the accommodation hole. In this way, the conductive member 201 may be stably fixed at the annular periphery, while a region inside the notch 205 can be pulled apart under action of external force such as tensile force of the flipping member 202 or the direct pressure of the gas because the region inside the notch 205 is not connected to the battery post 104.

In the present disclosure, the current interruption device may be in communication with gas inside the battery in multiple manners. The battery posts 104 and 104' are each provided with an air-guide duct communicating an inner part of the case and the current interruption device 200. In this way, air pressure is applied to the current interruption device by directly using internal structures of the battery posts 104 and 104'. Therefore, the structure is simpler.

Figure 9:
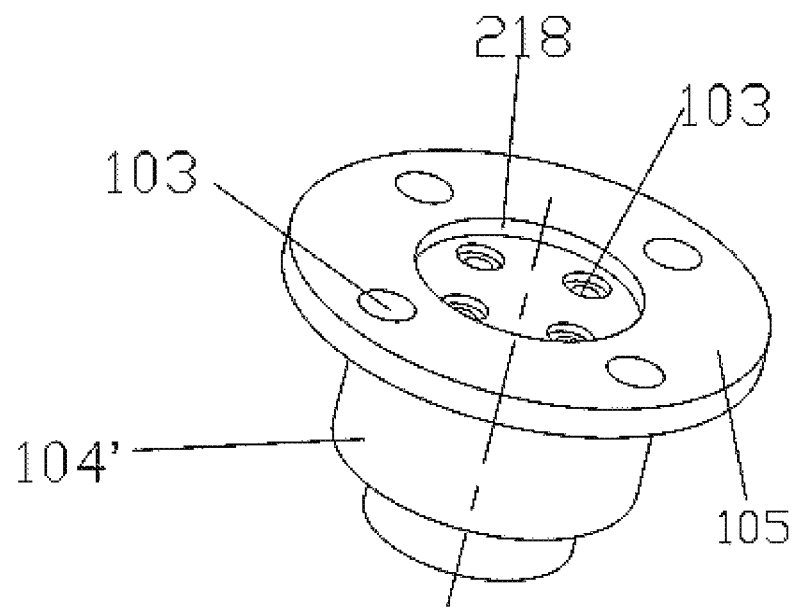
FIG. 9 is a three-dimensional schematic structural diagram of the battery post in FIG. 8.

In an embodiment shown in FIG. 8 and FIG. 9, the air-guide duct includes two types of air-guide holes 103. A first-type air-guide hole 103 is used to communicate the accommodation hole 218 and an inner part of the case, that is, directly apply pressure to the conductive member 201 to punch the notch 205 apart. That is, the air-guide duct includes the air-guide hole 103 for communicating the accommodation hole 218 and the inner part of the case. A second-type air-guide hole 103 is used to communicate the flipping member 202 and the inner part of the case, to apply pressure to the flipping member to pull the notch 205 apart. To improve stress distribution efficiency of the flipping member 202, there are multiple such type of air-guide holes 103 surrounding the accommodation hole. Therefore, under joint action of the two types of air-guide holes 103, sensitivity of the current interruption device can be improved.

Specifically, as shown in FIG. 8, the battery post 104' is fixedly connected to the cover plate 102, so that the structure of the electrode terminal is stable. An outer end periphery the battery post 104' has a radial boss 105, the radial boss 105 fixedly connected to the cover plate 102, and the second-type air-guide hole 103 is formed in the radial boss 105, so that gas flows to the flipping member 202. The first-type air-guide holes 103 are formed inside the battery post 104' along an axial direction. That is, the air-guide hole 103 located in the radial boss 105 is used to apply pressure to the flipping member 202, while the air-guide hole 103 below the accommodation hole 218 may directly apply pressure to the conductive member 201. As shown in FIG. 9, in this embodiment of the present disclosure, the radial boss 105 of the battery post 104' and a body of the battery post are both provided with the air-guide hole 103. The first-type air-guide holes 103 in the body of the battery post is in communication with the accommodation hole 218 in the end surface, and there are four first-type air-guide holes 103 which are disposed at equal intervals along a circumferential direction. In another embodiment, alternatively, there may be another quantity of first-type air-guide holes 103. The quantity of first-type air-guide holes is not limited in the present disclosure.

As shown in FIG. 3, FIG. 8, and FIG. 10, to prevent the cover plate from being electrified, preferably, the battery posts 104, 104', and 104" need to be insulated from the cover plate when fixedly connected to the cover plate. Therefore, the battery posts 104, 104', and 104" are fixedly connected to ceramic rings 207 and 207' tightly connected to the cover plate 102, for example, with ceramic brazing. This achieves higher reliability and weather resistance than insulation implemented by using plastics or rubber, and not only stable and tight connection of the current interruption device can be implemented, but also insulation between the battery posts and the cover plate can be implemented. Specifically, outer end peripheries of the battery posts 104, 104', and 104" have the radial bosses 105 and 105', and inner edges of the ceramic rings 207 and 207' have radial supports 208 and 208' supporting and connected to the radial bosses 105 and 105'. The radial bosses 105 and 105' are embedded in the ceramic rings 207 and 207' and are connected to the radial supports 208 and 208'. That is, the radial supports 208 and 208' are relatively thin to form a staircase-type accommodation space in which the battery posts 104, 104', and 104" are embedded.

Figure 11:
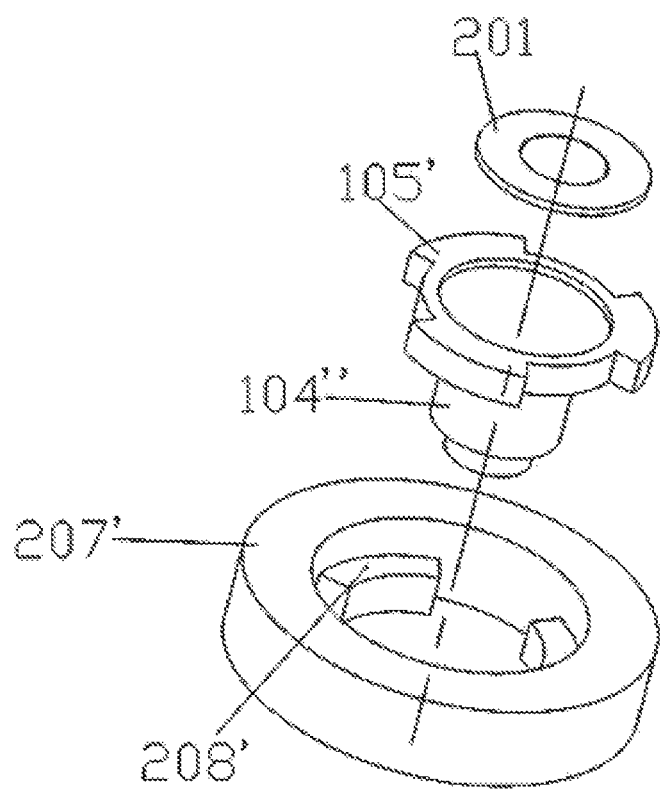
FIG. 11 is a three-dimensional schematic structural diagram of the battery post and the ceramic ring in FIG. 10.

In the embodiment shown in FIG. 11, different from the foregoing gas release manner in which the battery post includes the air-guide hole 103, there are multiple radial bosses 105' and multiple radial supports 208' disposed at intervals along the circumferential direction. That is, there are multiple radial bosses 105' disposed at intervals along the circumferential direction, and there are multiple radial supports 208' disposed at intervals along the circumferential direction. In addition, the multiple radial bosses are in a one-to-one correspondence with the multiple radial supports. In this way, gas release may be implemented by using spacing between adjacent radial bosses 105' and spacing between the radial supports 208'. The structure is simpler and more ingenious, the processing is easy, and the battery post 104″ does not need to be additionally provided with any air-guide duct. Therefore, a region on the battery post 104″ for assembling the conductive member 201 is not affected. In addition, a size of the conductive member 201 may be maximized, to increase a size of the notch and ensure sensitivity in pulling apart the notch. In this embodiment, there are three radial bosses 105′ disposed at equal intervals, to ensure both connection stability and air permeability. In another embodiment, there may be another quantity of radial bosses, for example, four or more radial bosses.

Outer end surfaces of the ceramic rings 207 and 207′ are each formed in a stepped structure having an inner ring and an outer ring. The battery posts 104, 104′, and 104″ are in embedded connection with the inner rings. A difference lies in that in an embodiment of a one-piece radial boss 105, the inner ring is formed in an integral annular radial support, while in an embodiment of a separable radial boss 105′, the inner ring is formed as the foregoing multiple disposed at intervals radial supports 208′, thereby making the overall structure more compact and the connection more stable.

In the foregoing embodiment, to establish a current flowing path to the outside, preferably, the outer end surfaces of the ceramic rings 207 and 207′ are tightly connected to the conductive ring 216, and are specifically connected to the outer ring. The outer periphery of the flipping member 202 is fixedly connected to the conductive ring 216. That is, the flipping member 202 is connected to the ceramic rings 207 and 207′ by using the conductive ring. The conductive ring may establish a current loop between the flipping member and the outside. To prevent the conductive ring from being still electrically connected to the battery post after the notch is pulled apart, and invalidating the function of the current interrupt, preferably, the conductive ring 216 is tightly connected to the outer ring of the ceramic ring to be insulated from the battery post. In other words, the battery posts 104, 104′, and 104″ are insulated from the conductive ring 216 by using the ceramic ring. Moreover, the conductive ring 216 is tightly connected to the ceramic ring so that the outer periphery of the flipping member can be sealed, and the air pressure inside the case can act on the flipping member without leakage.

To implement stable connection between the conductive ring and the flipping member, an outer end surface of the conductive ring 216 includes an L-shaped rabbet, and an inner end surface of the conductive ring 216 is used for connecting to the outer ring of the ceramic ring. The outer periphery of the flipping member 202 is embedded in and supports the L-shaped rabbet. In addition, the outer periphery is tightly connected to the L-shaped rabbet by using a covering cap 210 covering the flipping member 202. Therefore, the current interruption device 200 can be protected while stable sealing and assembling of the flipping member 202 are implemented. Moreover, the conductive ring 216 may establish a current loop to the outside world by connecting to the covering cap or by using electrode guide pieces directly connected to each other. For example, adjacent single-cell batteries 100 or adjacent battery modules may be connected to each other by using electrode guide pieces.

In order that the ceramic rings 207 and 207′ are easily and tightly connected to the cover plate 102, preferably, inner end surfaces of the ceramic rings 207 and 207′ are tightly connected to the transition ring 209. The transition ring 209 may be connected to the ceramic rings 207 and 207′ with ceramic brazing. In addition, the transition ring 209 is tightly connected to the cover plate 102. The transition ring 209 may further be used so that the ceramic rings 207 and 207′ and the cover plate 102 are disposed at intervals. Because the ceramic rings 207 and 207′ are not directly assembled with the cover plate 102, the cover plate 102 can be protected from high temperature caused during brazing of the ceramic ring. Moreover, areas of the ceramic rings 207 and 207′ are not limited by a need of being directly assembled with the cover plate 102. In addition, no specific design is required for the ceramic rings 207 and 207′, so that manufacturing and assembling are convenient.

As shown in FIG. 3, FIG. 8, and FIG. 10, preferably, the transition ring 209 has an inner ring and an outer ring that form a Z-shaped structure. The cover plate 102 includes a through hole through which the battery posts 104, 104′, and 104″ pass. An end surface of the through hole is in a staircase structure. The inner ring of the transition ring is embedded in and supports the staircase structure. That is, in FIG. 3, FIG. 8 and FIG. 10, the inner ring is located at the bottom and is in embedded into the through hole, thereby increasing a contact area of the two and ensuring connection stability.

Therefore, in the foregoing embodiment, to implement the current interruption device 200, the outer periphery of the flipping member 202 needs to be sealed. Specifically, the ceramic rings 207 and 207′ are tightly connected between the outer periphery of the flipping member and the cover plate, thereby implementing stable and reliable operation of the current interruption device by using a ceramic sealing structure. In such a ceramic sealing structure, tight connections between the cover plate and the transition ring, between the transition ring and the ceramic ring, between the ceramic ring and the conductive ring, and between the conductive ring and the flipping member enable the air pressure inside the case to effectively act on the current interruption device, so that the operation of the current interruption device is reliable. During assembling, to ensure leak tightness of the current interruption device, the ceramic rings 207 and 207′ are separately and tightly connected to the conductive ring 216, the battery posts 104, 104′, and 104″, and the transition ring 209 with ceramic brazing. That is, the conductive ring 216, the battery posts 104, 104′, and 104″, and the transition ring 209 first form an independent assembly, and then the transition ring 209 is assembled to the cover plate 102 with laser welding. The assembling manner is convenient and the ceramic ring does not need to be welded to the cover plate with brazing. Moreover, the conductive member 201 may be connected to the battery posts 104, 104′, and 104″ with laser welding. The flipping member and the conductive member may be connected to each other with laser penetration welding or by using the foregoing boss welded structure, or in another manner. The covering cap 210 and the conductive ring may be connected to each other with laser welding. In addition, the battery posts 104, 104′, and 104″ and a guide piece of the battery cell may be welded together with laser welding, to complete the overall assembly of the current interruption device.

The structure of the current interruption device 200 is mainly described above. The following describes a disposition manner of the current interruption device 200.

To ensure normal and timely operation of the foregoing air pressure-driven current interruption device 200, a size of the current interruption device 200 may be designed relatively large. In this way, if air pressure cannot be changed, pulling strength can be increased by increasing a force receiving area. For example, an area of the flipping member is designed relatively large to increased pulling strength of the flipping member. In the embodiment shown in FIG. 1, the current interruption device 200 is designed to extend out of the cover plate 102 along the radial direction, to increase the size. In this case, in the battery module, there are multiple single-cell batteries 100. To prevent the current interruption device 200 extending outwards from affecting an electrode terminal in adjacent single-cell batteries 100, preferably, between the adjacent single-cell batteries 100, the current interruption device 200 and an adjacent electrode terminal are staggered in a direction of extension of the cover plate. This can fully use a region, in which no electrode terminal 101 is disposed, on the cover plate 102, so that the protruding current interruption device does not affect a structure in the cover plate, and occupancy of space inside the battery pack can be fully reduce, thereby increasing energy density in the inclusion body. It should be noted that, herein and in the following description of the present disclosure, a meaning of "between the adjacent single-cell batteries", "between the current interruption device and the adjacent electrode terminal", or "between adjacent electrode terminals" refers to connection of adjacent features between different single-cell batteries, instead of connection of adjacent features in a same single-cell battery.

In this embodiment, the current interruption device 200 and the adjacent electrode terminal 101 are staggered in the direction of extension of the cover plate. In another embodiment, the current interruption device 200 and the adjacent electrode terminal 101 may alternatively be staggered in a height direction.

In an embodiment, as shown in FIG. 1, between the adjacent single-cell batteries 100, the current interruption device 200 is connected to the adjacent electrode terminal by using an L-shaped connecting member 214. The L-shaped connecting member 214 has a cover portion 211 and a guide portion 212. The cover portion 211 covers and is connected to the current interruption device 200. The guide portion 212 extends to the adjacent electrode terminal, to be adjacent to the electrode terminal. The L-shaped connecting member shown in FIG. 1 is first aligned with the electrode terminal in the direction of extension of the cover plate, and then extends to the electrode terminal. In another embodiment, alternatively, the L-shaped connecting member may first extend to an adjacent cover plate, and then extends to the electrode terminal, to implement electrical connection between the two.

Figure 2:
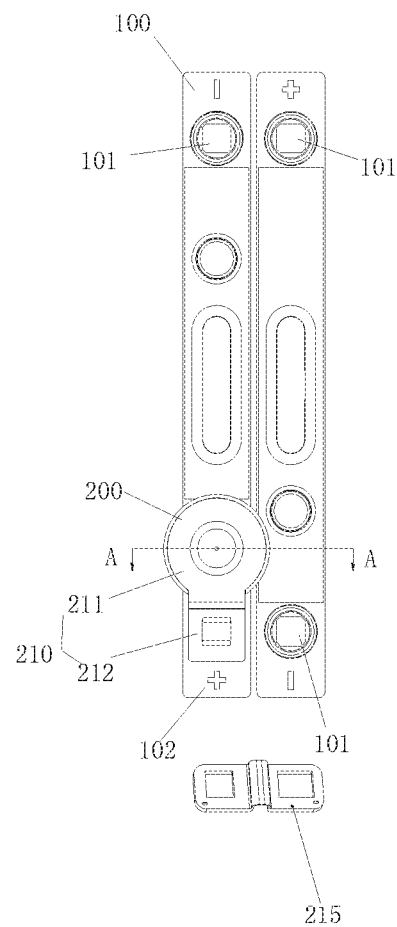
FIG. 2 is a schematic structural top view of two adjacent single-cell batteries according to the present disclosure.

In another embodiment, as shown in FIG. 2, between the adjacent single-cell batteries 100, the current interruption device 200 includes a covering cap 210 covering the flipping member 202. The covering cap 210 extends along the cover plate 102, to be aligned with the adjacent electrode terminal, that is, has the cover portion 211 and the introduction portion 212 that are disposed linearly, and is connected to the adjacent electrode terminal by using a linear I-type connecting member 215. The I-type connecting member 215 may be further configured to connect other electrode terminals 101 between the single-cell batteries 100 and in which the current interruption device 200 is not disposed. In this way, with the covering cap 210 in such shape, the entire battery module basically may need only this type of connecting member.

Figure 12:
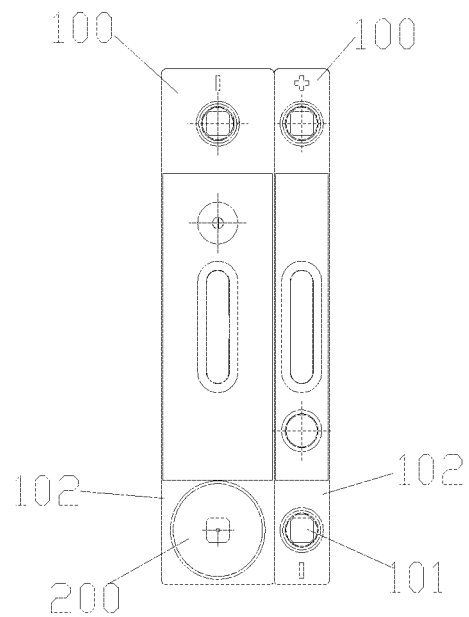
FIG. 12 is a schematic structural diagram of two adjacent single-cell batteries according to an embodiment of the present disclosure.

Different from the embodiment shown in FIG. 2, as shown in FIG. 12, alternatively, the single-cell battery 100 may be enlarged to adapt to a relatively large current interruption device. Specifically, between the single-cell batteries 100, a width of a single-cell battery 100 provided with the current interruption device 200 is greater than a width of the single-cell battery not provided with the current interruption device 200. In addition, the current interruption device 200 extends close to an edge of the width of the cover plate 102, so that the current interruption device 200 can also be adapted to.

Moreover, because the corresponding single-cell battery is wide, the current interruption device can be caused not protrude the cover plate, so that the adjacent electrode terminals can be aligned with each other. This can also avoid impact of the current interruption device 200 extending out of the cover plate 102 on a welding structure or another structure of the adjacent cover plate 102. In addition, preferably, the current interruption device and the adjacent electrode terminal can be caused to be connected to each other by using the linear I-type connecting member 215.

Moreover, during use, although the width of the single-cell battery 100 is increased, a capacity of the battery cell is not increased. That is, a battery cell capacity of the single-cell battery 100 provided with the current interruption device 200 is the same as a battery cell capacity of the single-cell battery 100 not provided with the current interruption device. Therefore, existence of single-cell batteries with different capacities in a same module is avoided, thereby avoiding impact on a BMS. Because of the same battery cell capacity, residual space inside the case may be filled up by using a partition plate. That is, the battery cell is surrounded by the partition plate, so that an assembling structure of the battery cell is stable. Comprehensively considers the size of the battery module and the size of the single-cell battery, a ratio of the size of the battery cell to the size of the partition plate may be 1:1 to 2:1. The partition plate may be made of an electrolyte resistance material.

Moreover, considering a current interrupt effect, costs, and assembling, in the multiple single-cell batteries 100 in the same module, the number of single-cell batteries provided with the current interruption device 200 needs to be not greater than three. Preferably, the number of single-cell batteries provided with the current interruption device 200 is three. Preferably, the single-cell batteries provided with the current interruption device 200 is single-cell batteries located on an end portion and in the central part of the battery module. If the battery module includes n sequentially arranged single-cell batteries, the single-cell batteries on the end portion of the battery module are a first single-cell battery of the battery module and an $n^{th}$ single-cell battery of the battery module. When n is an odd number, the single-cell battery in the central part of the battery module is the $((n+1)/2)^{th}$ single-cell battery of the battery module. When n is an even number, the single-cell battery in the central part of the battery module is the $(n/2)^{th}$ single-cell battery or the $((n+2)/2)^{th}$ single-cell battery of the battery module, where n>3.

The current interruption device, the single-cell battery, and the battery module provided in the embodiments according to FIG. 1 to FIG. 12, features such as a boss welded structure, an elliptical notch, and a ceramic ring according to the embodiments of FIG. 1 to FIG. 12 without departing from the idea of the present disclosure all can be applied to the following other embodiments. The following describes a single-cell battery according to another embodiment of the present disclosure with reference to FIG. 13 to FIG. 17.

Figure 13:
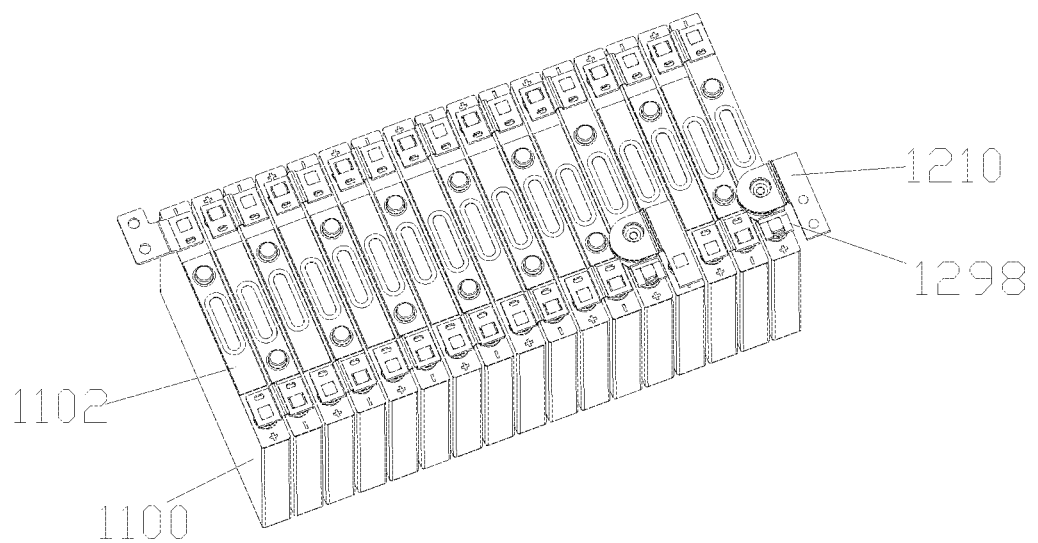
FIG. 13 is a three-dimensional schematic structural diagram of a power battery according to an embodiment of the present disclosure.
Figure 14:
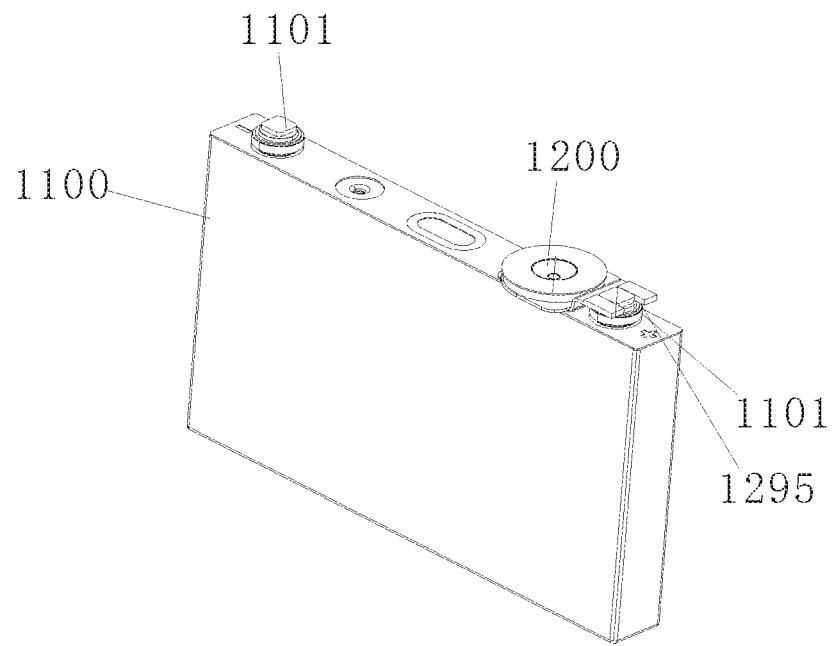
FIG. 14 is a three-dimensional schematic structural diagram of a single-cell battery according to an embodiment of the present disclosure.
Figure 15:
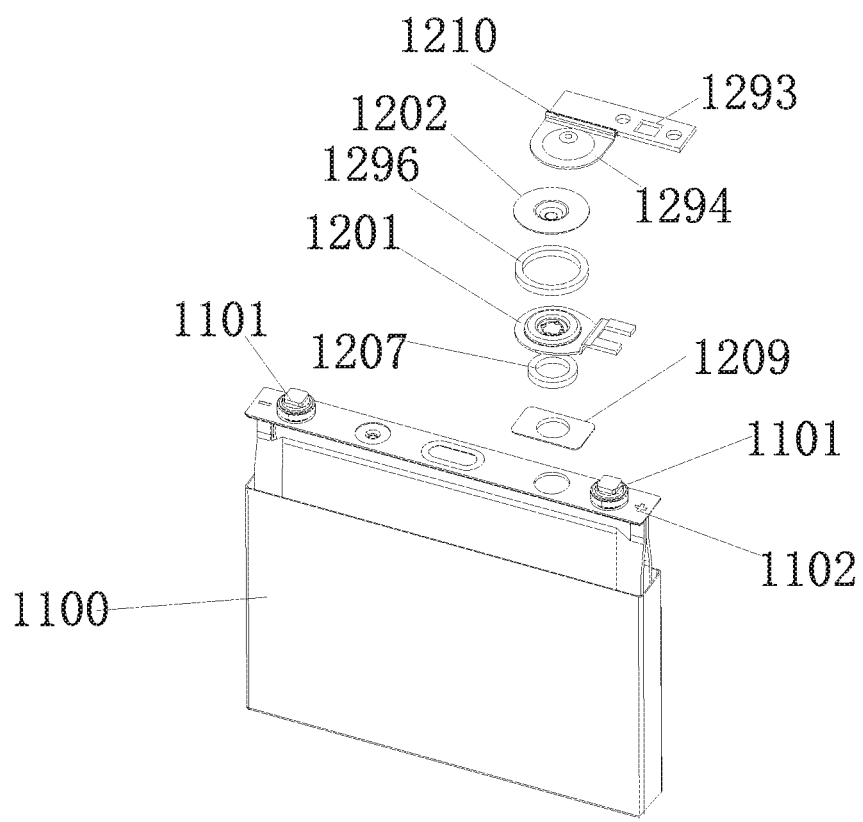
FIG. 15 is an exploded three-dimensional schematic structural diagram of the single-cell battery in FIG. 14.

As shown in FIG. 13 to FIG. 15, an embodiment provides a single-cell battery 1100. The single-cell battery 1100 includes a case, a battery cell accommodated in the case, an electrode terminal 1101 electrically connected to the battery cell, and a cover plate 1102 for sealing the case. The electrode terminal 1101 is disposed on the cover plate 1102, to input and output currents. The single-cell battery 1100 further includes a current interruption device 1200 in communication with gas inside the case. Different from the manner of being mounted on the electrode terminal in the embodiment according to FIG. 1 to FIG. 12, the current interruption device 1200 is disposed on the cover plate and is in communication with the gas inside the case. The current interruption device 1200 has a conductive member 1201 and a flipping member 1202 electrically connected to the conductive member 1201. The flipping member 1202 and the conductive member 1201 can be electrically disconnected from each other under action of air pressure. That is, the operating principle of the current interruption device 1200 is basically the same as that of the current interruption device in the embodiments according to FIG. 1 to FIG. 12. In both operating principles, a circuit is disconnected due to flipping of the flipping member implemented by sensing the air pressure inside the single-cell battery.

Figure 17:
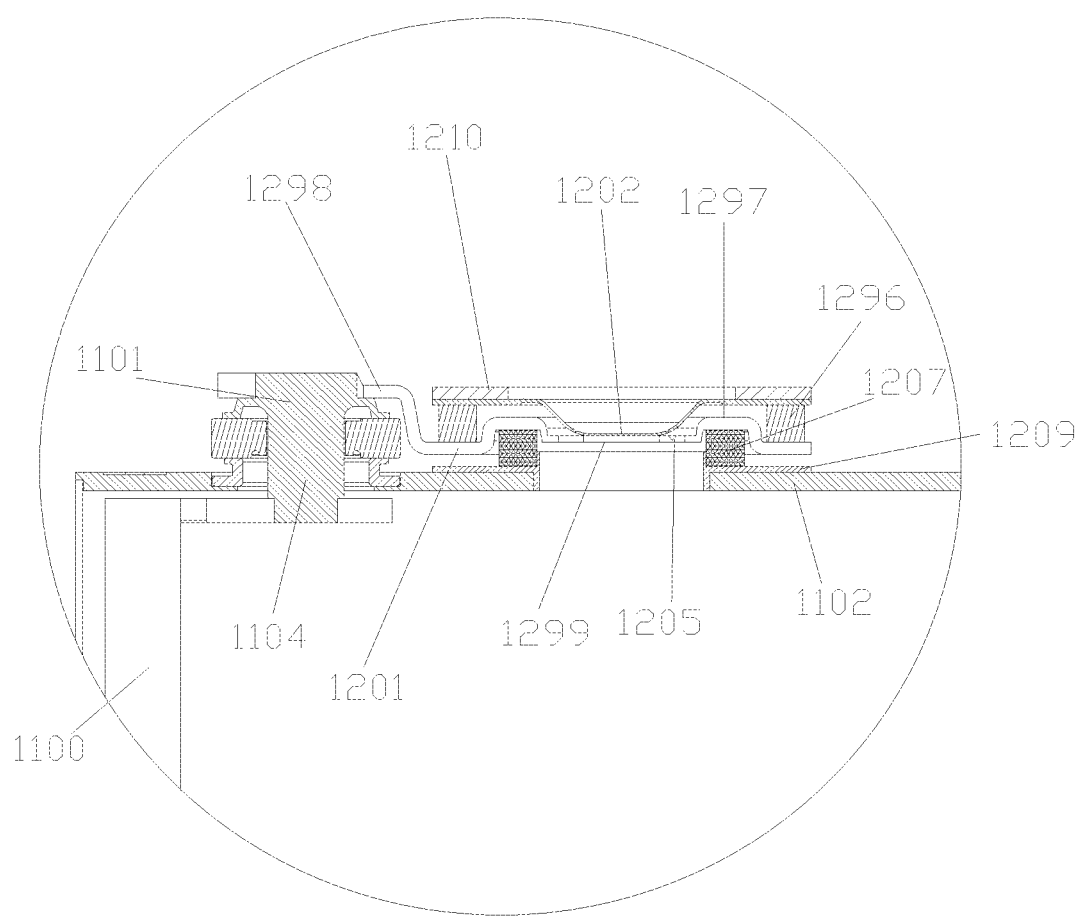
FIG. 17 is a partial schematic structural sectional view of the single-cell battery in FIG. 14.

As shown in FIG. 17, because the current interruption device 1200 is not disposed on the electrode terminal, the conductive member 1201 has a body portion 1299 connected to the flipping member 1202 and a connecting portion 1298 extending from the body portion 1299 to the electrode terminal 1101 and connected to the electrode terminal 1101. Therefore, in this embodiment, the current interruption device 1200 is disposed on the cover plate. This can avoid an increase in the height of the electrode terminal 1101, thereby increasing battery capacity density by using a length space of the cover plate.

Figure 16:
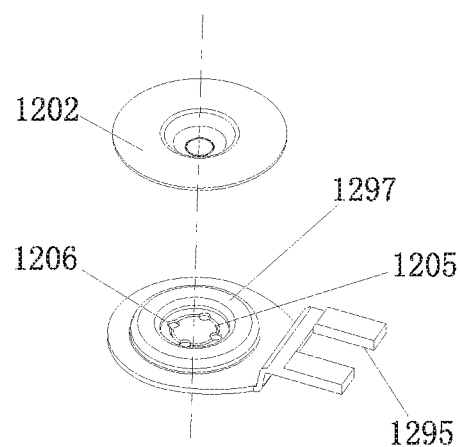
FIG. 16 is an exploded three-dimensional schematic structural diagram of a flipping member and a conductive member in FIG. 15.

As shown in FIG. 15 to FIG. 17, in this embodiment, the body portion 1299 of the conductive member 1201 is in communication with gas inside the case and includes a notch 1205. The notch 1205 is disposed around a connection point for connecting to the flipping member 1202. In this way, the notch can be pulled apart under internal air pressure, thereby disconnecting the electrical connection between the flipping member and the conductive member. Further, the notch 1205 includes an air vent 1206. In this way, the air vent 1206 may be used to enable the air pressure to be applied to the flipping member 1202, and the flipping member is used to apply tensile force to the notch. In addition, the notch 1205 can be easily pulled apart at a location of the air vent 1206, thereby improving sensitivity of the flipping member 1202. In this case, the notch may be alternatively disposed in the flipping member. There may be multiple air vents 1206 disposed at intervals along the notch 1205. Moreover, for features of the notch, the air vent, and the like, all features in the embodiments according to FIG. 1 to FIG. 12 can be applied to this embodiment. In another embodiment, the body portion of the conductive member and the flipping member may be separately provided with notches. In this way, when the air pressure inside the case increases continuously, in addition to pulling apart the notch in the conductive member, the notch in the flipping member may further be pulled apart. In this case, the gas inside the battery can be discharged from the flipping member to the outside, thereby avoiding a further increase in the air pressure inside the case of the single-cell battery. Moreover, a gas sensor inside an inclusion body of the battery may be alternatively caused to sense an alarm or disconnect a circuit. This part is to be described in detail below.

Specifically, the notch 1205 in the body portion can be pulled apart under action of first air pressure inside the case, the notch in the flipping member can be pulled apart under action of second air pressure inside the case, and the second air pressure is greater than the first air pressure. That is, strength of the notch in the body portion of the conductive member is less than strength of the notch in the flipping member, so that the notch in the body portion of the conductive member can be pulled apart by the smaller first air pressure. The notch in the flipping member is not further pulled apart for pressure relief unless the air pressure continues to increase.

In this embodiment, to ensure that the flipping member 1202 can be under action of the air pressure inside the case, the outer periphery of the flipping member 1202 is tightly connected to the conductive member 1201, to prevent gas from leaking from the outer periphery of the flipping member and prevent pressure relief. Specifically, the cover plate 1102 includes an air vent in communication with gas inside the case, and the cover plate is tightly connected to a first ceramic ring 1207 surrounding the air vent. The body portion 1299 is tightly connected to the first ceramic ring 1207, so that internal air pressure can be applied to the body portion 1299 instead of leaking to the outside. Moreover, to stably assemble the flipping member 1202, the outer periphery of the flipping member 1202 is tightly connected to a second ceramic ring 1296, and the second ceramic ring is tightly connected to the conductive member 1201. Therefore, with the insulation feature of the second ceramic ring, the outer periphery of the flipping member 1202 can be stably supported, and the conductive member can be insulated from the outer periphery of the flipping member 1202 by using the second ceramic ring 1296. In this way, after the flipping member 1202 and the conductive member 1201 can maintain current disconnection after the notches 1205 are pulled apart, thereby interrupting the current.

Specifically, as shown in FIG. 16 and FIG. 17, the body portion 1299 of the conductive member 1201 includes an annular boss 1297 surrounding the notch 1205. In this way, with the structure of the annular boss 1297, an inner side of the annular boss 1297 in a radial direction may be used for forming the notch 1205 and other features, and a rear concave portion of the annular boss 1297 tightly accommodates the first ceramic ring 1207. Moreover, an outer side of the annular boss 1297 may be used to tightly support the second ceramic ring 1296. In this way, in this embodiment, with the unique feature of the conductive member 1201 shown in FIG. 16 and FIG. 17, the current interruption device 1200 can be more easily mounted.

Moreover, the first ceramic ring 1207 is tightly connected to the cover plate 1102 by using a transition ring 1209. As shown in FIG. 17, the transition ring 1209 has a connecting body embedded into an inner wall of the air vent and a flange ring for connecting to the first ceramic ring 1207. The flange ring protrudes from the connecting body along the radial direction and presses tightly against the cover plate. Therefore, stable mounting of the current interruption device 1200 is ensured, and the first ceramic ring 1207 does not need to be directly connected to the cover plate 1102.

In this embodiment, for convenience of connection, preferably, as shown in FIG. 17, the electrode terminal 1101 includes a battery post 1104 passing through the cover plate 1102 and electrically connected to the battery cell. As shown in FIG. 14 and FIG. 16, a connecting portion 1298 of the conductive member 1201 includes a slot 1295. The battery post 1104 penetrates the slot 1295, and the battery post 1104 is welded to the slot 1295, so that the battery post 1104 is stably connected to the conductive member 1201. Moreover, as shown in FIG. 15, the current interruption device 1200 includes a connecting member 1210 covering the flipping member 1202 and electrically connected to the flipping member 1202. The connecting member 1210 has a cover portion 1294 covering the flipping member 1202 and a guide portion 1293 extending from the cover portion 1294. The connecting member 1210 may be formed in a structure the same as that of the L-shaped connecting member 214 in the embodiment according to FIG. 1 to FIG. 12. That is, the cover portion and the guide portion form an L-shaped connecting member. In this way, a current can be easily guided from the current interruption device 1200 to an adjacent electrode terminal or out of a module.

In a battery module in which at least one of the single-cell batteries is the single-cell battery 1100, the current interruption device extends out of the cover plate in a radial direction, thereby increasing a force receiving area and increasing pulling strength. Between adjacent single-cell batteries, the current interruption device and an adjacent electrode terminal are staggered in a direction of extension of the cover plate 1102, to avoid affecting the structure of an adjacent cover plate. Moreover, the same as the embodiment according to FIG. 1 to FIG. 12, there are a maximum of three single-cell batteries 1100 that are provided with the current interruption device 1200.

The single-cell battery provided in the embodiments according to FIG. 13 to FIG. 17 is described above, and different feature according to the embodiments of FIG. 1 to FIG. 12 are mainly described. These features of the embodiments may be replaced with each other or combined when there is no contradiction. For this, details are not described herein again in the present disclosure.

Figure 18:
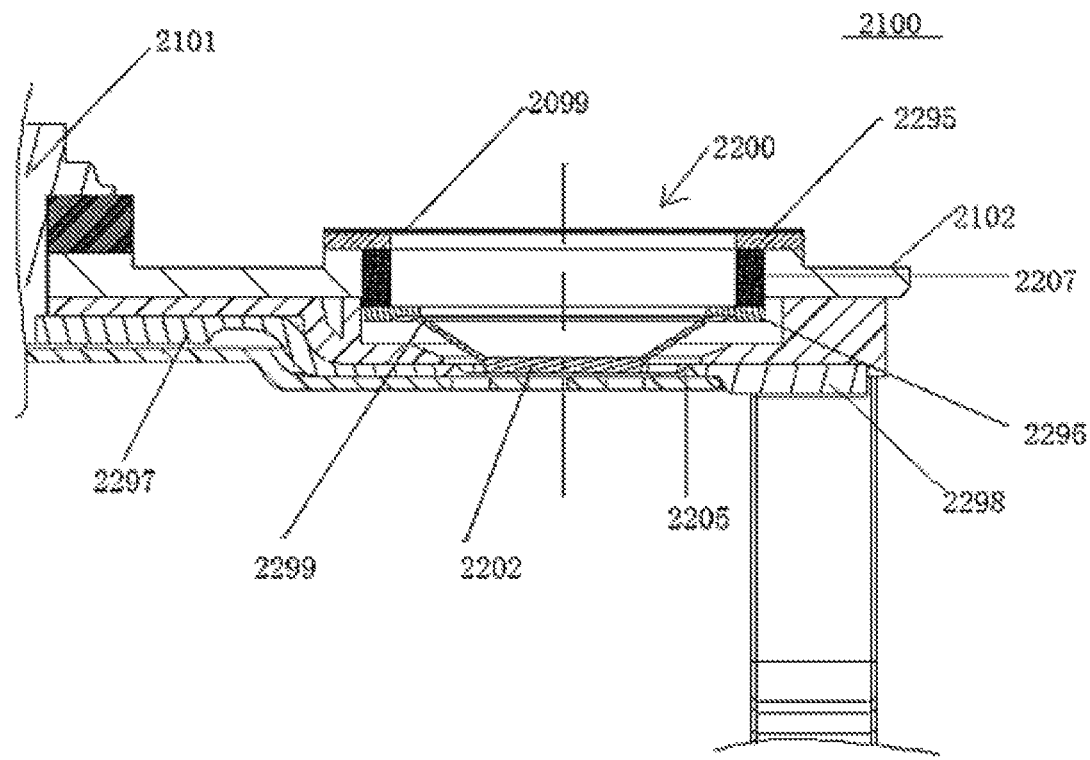
FIG. 18 is a partial schematic structural sectional view of a single-cell battery according to an embodiment of the present disclosure.

The following describes a single-cell battery 2100 according to an embodiment of the present disclosure with reference to FIG. 18. The single-cell battery 2100 includes a case, a battery cell accommodated in the case, an electrode terminal 2101 electrically connected to the battery cell, and a cover plate 2102 for sealing the case. The electrode terminal 2101 is disposed on the cover plate 2102. The single-cell battery includes a first electrode guide member 2298 electrically connected to the battery cell, and a second electrode guide member 2297 electrically connected to the electrode terminal 2101. The cover plate 2102 is further provided with an explosion relief valve 2200 in communication with gas inside the case. The explosion relief valve 2200 has a flipping member 2202 connecting the first electrode guide member 2298 and the second electrode guide member 2297. That is, the two electrode guide members are connected to each other by using the flipping member 2202.

The first electrode guide member 2298 and/or the second electrode guide member 2297 includes a first notch 2205. The first notch 2205 can be disconnected under action of air pressure in the case, to interrupt a current on the first electrode guide member 2298 and/or the second electrode guide member 2297. That is, the first notch is used so that the electrode guide member provided with the first notch is disconnected, thereby stopping transmission of the current. Therefore, the battery cell and the electrode terminal can be electrically disconnected from each other when at least one of the two electrode guide members includes the first notch, thereby disconnecting current transmission between the single-cell battery and the outside. Moreover, the flipping member 2202 is further provided with a second notch 2299. The second notch 2299 can be disconnected under action of the air pressure in the case, so that the gas inside the case is discharged to the outside through the flipping member 2202. That is, the second notch is used for gas release. After the second notch is disconnected, the internal gas can be discharged to the outside, thereby avoiding an explosion caused by a further increase in air pressure inside the battery, and achieving an explosion proof effect.

Specifically, the first notch can be pulled apart under action of first air pressure inside the case, the second notch can be pulled apart under action of second air pressure inside the case, and the second air pressure is greater than the first air pressure. That is, strength of the first notch 2205 is less than that of the second notch 2299, so that the first notch 2205 can be pulled apart by the smaller first air pressure. The second notch 2299 is not further pulled apart for pressure relief unless the air pressure continues to increase.

As shown in FIG. 18, in this embodiment, the two electrode guide members may be in an elongated sheet structure, so that the current can be interrupted. The first notch 2205 extends from an edge on one side to an edge on the other side along a width direction of the elongated sheet structure. In this way, the elongated sheet structure can be broken in a timely manner along the first notch. The flipping member 2202 may be provided with an annular outer wall. The two electrode guide members may be fixedly connected to the annular outer wall, to implement current transmission. Specifically, in the present disclosure, the annular outer wall of the flipping member may be formed by using, for example, a boss in a boss welded structure. In addition, the flipping member is further formed in a conical ring structure. The conical ring obliquely extends outwards from the boss to an outer periphery of the flipping member, to form the flipping member in a bowl shape. Moreover, the second notch may be formed in an annular shape around the periphery of the flipping member, so that the second notch can be completely disconnected under action of the air pressure, thereby improving gas pressure relief efficiency. Specifically, the second notch may be formed in the conical ring structure. To enable the flipping member to be effectively under action of the air pressure to pull apart the first notch and the second notch, the outer periphery of the flipping member 2202 is tightly connected to and insulated from the cover plate in a relatively fixed manner. Therefore, on the one hand, gas can be prevented from being discharged to the outside when the first notch and the second notch are not pulled apart and the two notches are not effectively used. On the other hand, the cover plate can be prevented from being electrified with insulated connection.

In this embodiment, the electrode terminal 2101 includes a battery post passing through the cover plate. The battery post is insulated from and connected to an outer side of the cover plate by using the second ceramic ring, to facilitate establishment of a current loop with the outside. That is, current transmission between adjacent single-cell batteries is implemented with interconnection between electrode terminals. Use of the ceramic ring can prevent the cover plate from being electrified. Moreover, a first ceramic ring 2207 is tightly connected between the outer periphery of the flipping member 2202 and the cover plate, and is similarly used for sealing and insulation.

Moreover, to facilitate connection to the flipping member 2202, a first transition piece 2295 is fixedly connected to the cover plate 2102, and a second transition piece 2296 is fixedly connected to a periphery of the flipping member 2202. The first transition piece and the second transition piece may be aluminum sheets. The first transition piece 2295 and the second transition piece 2296 are coaxially in brazing connection with the first ceramic ring 2207. In this way, during assembling, the two transition pieces are first welded to the first ceramic ring with brazing, and then two fixing pieces are welded to another structure. This can avoid high temperature generated by brazing of the first ceramic ring and the structure such as the cover plate. Therefore, assembling is easily performed, the first ceramic ring 2207 is used to implemented tight, stable, and insulated connection, and the cover plate 2102 can be prevented from being electrified.

Specifically, the first transition piece 2295 and the second transition piece 2296 may be annular structures to fit two annular end surfaces of the first ceramic ring. Moreover, preferably, the cover plate 2102 includes an annular boss. The first transition piece 2295 is supported in the annular boss. The first ceramic ring presses tightly against an inner wall of the annular boss and extends towards the second transition piece 2296, so that the first ceramic ring is stably connected inside the cover plate 2102.

Moreover, the explosion relief valve further includes a protective film 2099 that can be torn by punching by the air pressure. The protective film tightly covers the flipping member 2202, and specifically, is connected to the first transition piece 2295 away from the flipping member. In this way, normally, the protective film 2099 can protect the inner part of the explosion relief valve 2200, and can be torn by punching by certain air pressure, for example, second air pressure, when explosion proof is required, thereby avoiding impact on an explosion proof effect of the explosion relief valve.

Moreover, in the present disclosure, in order that the two notches are sequentially pulled apart, a ratio of a residual thickness of the first notch to a residual thickness of the second notch is 1:3 to 1:1.2, and further, is 1:2 to 1:1.3.

The single-cell battery provided in the embodiment according to FIG. 18 of the present disclosure is described above. The following describes an embodiment according to the present disclosure with reference to FIG. 22 and FIG. 23.

This embodiment provides a single-cell battery 3100 and a battery module using the single-cell battery. The single-cell battery 3100 includes a case, a battery cell accommodated in the case, a cover plate 3102 for sealing the case, and an electrode terminal 3101 disposed on the cover plate 3102. The single-cell battery 3100 further includes an internal guide member 3299 electrically connected to the battery cell and a current interruption device 3200 connected between the internal guide member 3299 and the electrode terminal 3101. Different from the manner of being mounted on the outer end of the battery post in the embodiments according to FIG. 1 to FIG. 12, the current interruption device 3200 in this embodiment is located at the inner side of the cover plate 3102 and is in communication with gas inside the case, to be capable of interrupting, under action of air pressure, a current flowing through the current interruption device 3200. An adaptor portion 3298 extending outwards from an outer periphery along a radial direction is connected to the electrode terminal 3101, so that the electrode terminal 3101 is connected to the outer periphery of the current interruption device by using the adaptor portion 3298.

In this way, the adaptor portion 3298 extending outwards from the outer periphery of the electrode terminal in the radial direction is used, so that compared with a manner of being directly connected to the electrode terminal, an area of the current interruption device whose outer side is connected to the adaptor portion 3298 in the radial direction can be designed larger, thereby increasing an area in which the internal air pressure applies force to the current interruption device. In this way, force received by the current interruption device can be increased while the air pressure remains unchanged, thereby improving sensitivity of the current interruption device 3200, and implementing a current interrupt in timely manner. Particularly, when the battery of the present disclosure is applied in the field of large batteries such as power batteries, a high current usually needs to be transmitted. Therefore, addition of the adaptor portion and enlarging the size of the current interruption device can both facilitate transmission of the high current.

In this embodiment, the adaptor portion 3298 is formed in an annular structure. An inner periphery of the annular structure is connected to the outer periphery of the electrode terminal, and the outer periphery is connected to the outer periphery of the current interruption device, so that the area of the current interruption device is increased. In another embodiment, the adaptor portion 3298 may alternatively be a structure of multiple connection posts extending along the radial direction and disposed at intervals along a circumferential direction. This can also increase the area of the current interruption device.

In this embodiment, to increase tightness of the adaptor portion with the electrode terminal and the current interruption device, and ensure stable current transmission, preferably, the inner periphery of the annular structure fits a rabbet in an outer periphery of an inner end of the electrode terminal. Specifically, the outer periphery of the inner end of the electrode terminal includes a rabbet, and the inner periphery of the adaptor portion is embedded into and connected to the rabbet. In this way, a connection area is increased, so that current transmission efficiency is improved while stability of the connection is ensured. Inner and outer ends of the electrode terminal are defined relative to the case along an axial direction of the electrode terminal. That is, an end close to the inner part of the case is the inner end.

Moreover, in this embodiment, the outer periphery of the annular structure protrudes inwards the case. That is, the annular structure is formed in an annular cap structure, and the current interruption device fits the rabbet at the inner side of the outer periphery. This not only ensures stability of the connection and improves the current transmission efficiency, but also can space the current interruption device and the electrode terminal, thereby providing space for disconnecting the current interruption device under action of the air pressure.

In this embodiment, the internal guide member 3299 includes a connecting piece (not shown) connected to the battery cell. The connecting piece extends towards the cover plate from the battery cell. Moreover, the internal guide member further includes a support groove for accommodating and mounting the current interruption device, and connecting plates extending towards opposite directions from the support groove. The connecting plates are separately in insulated connection with the cover plate, thereby preventing the cover plate from being electrified. Specifically, the connecting plates and a connecting groove may form an integral sheet-like structure. That is, the connecting groove includes two side walls and one bottom wall. The two side walls are respectively connected to the connecting plates at two sides. Moreover, to cause the current interruption device to be in communication with the gas inside the case, the bottom wall of the support groove may be designed to be provided with an air passing hole in communication with the gas inside the case.

In this embodiment, to prevent the cover plate from being electrified, the internal guide member 3299 is in insulated connection with the inner side of the cover plate 3102 by using a ceramic member 3296. Specifically, the ceramic member 3296 may be formed as a ceramic sheet, and is in welded connection with the internal guide member 3299 and the cover plate by using transition pieces 3294. That is, there are two transition pieces 3294. The transition pieces may be aluminum sheets, located separately on upper and lower surfaces of the ceramic member 3296. The ceramic member 3296 is in welded connection with the cover plate 3102 by using the transition piece 3294 located on the upper surface of the ceramic member 3296. In addition, the ceramic member 3296 is further in welded connection with the internal guide member 3299 by using the transition piece 3294 located on the lower surface of the ceramic member 3296. In this way, welded connection between the ceramic member 3296 and the cover plate 3102 and between the ceramic member 3296 and the internal guide member 3299 are more easily implemented, and the welded structure is stable. The ceramic member 3296 may be connected to the transition pieces 3294 located on the upper and lower surfaces of the ceramic member 3296 with ceramic brazing. The transition piece 3294 located on the upper surface of the ceramic member 3296 may be connected to the cover plate 3102 with laser welding. The transition piece 3294 located on the lower surface of the ceramic member 3296 may be connected to the internal guide member 3299 with laser welding.

In this embodiment, the current interruption device 3200 has a conductive member 3201 and a flipping member 3202 connected to the conductive member 3201 for mutual electrical connection. In addition, the flipping member 3202 and the conductive member 3201 can be electrically disconnected from each other under action or air pressure. The conductive member 3201 is connected to the internal guide member 3299 and includes an air-guide hole 3213 in communication with gas inside the case. Specifically, the conductive member 3201 is embedded in and connected to a support groove of the internal guide member. In this way, an air passing hole formed in the support groove may be in gas communication with the air-guide hole 3213, so that the flipping member 3202 can feel pressure applied by the gas inside the case, thereby disconnecting the electrical connection between the flipping member 3202 and the conductive member 3201 under action of internal air pressure. An outer periphery of the flipping member 3202 and an outer periphery of the adaptor portion 3298 are connected to each other to establish a current connection path.

In this embodiment, in a manner of disconnecting the electrical connection, the conductive member 3201 includes a notch, and the notch is disposed surrounding a connection point for connecting to the flipping member 3202. In this way, under action of the internal air pressure, the notch is pulled apart, thereby disconnecting the electrical connection between the conductive member and the flipping member. In another embodiment, the notch may alternatively be formed in the flipping member or a manner of pulling apart a connection point between the two may be used. To apply the air pressure to the flipping member 3202, the outer periphery of the flipping member 3202 is in supporting connection with the conductive member 3201 and/or the internal guide member 3299 by using an insulation member 3295, thereby implementing assembling of the flipping member 3202 by using the insulation member 3295. This can ensure that the outer periphery of the flipping member is insulated from the internal guide member 3299 and the conductive member, thereby preventing the flipping member from still being electrically connected to the conductive member or the internal guide member at the outer periphery after the flipping member is electrically disconnected from the conductive member under action of the air pressure.

Specifically, the insulation member may be an annular insulation member such as a ceramic ring or a sealing ring. There are three connection manners for the insulation member. In a first manner, the insulation member tightly supports the conductive member 3201, and specifically, supports a region in the conductive member 3201 that surrounds a region that is pulled apart. In a second manner, the insulation member supports the internal guide member 3299, and specifically, supports a region of the internal guide member 3299 that surrounds the conductive member 3201. In a third manner, the insulation member supports both the internal guide member 3299 and the conductive member 3201. That is, as shown in FIG. 23, the insulation member supports a region connecting the internal guide member 3299 and the conductive member 3201.

Figure 23:
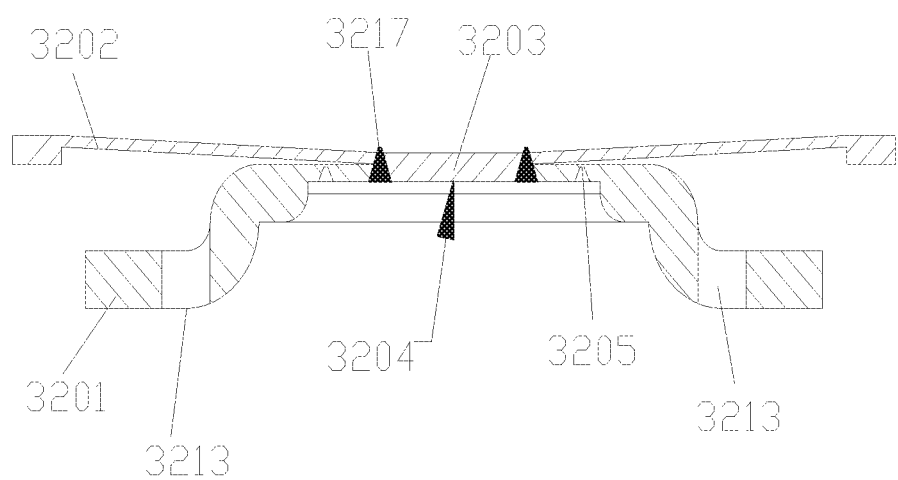
FIG. 23 is a schematic structural diagram of a current interruption device according to an embodiment of the present disclosure.

To ensure stable current transmission between the conductive member and the flipping member, especially, to be applicable to a high-current power battery, similar to the embodiments according to FIG. 1 to FIG. 12, if the conductive member includes a notch 3205, as shown in FIG. 23, the flipping member 3202 and the conductive member 3201 are connected to each other by using a boss welded structure surrounded by the notch 3205. The boss welded structure includes a boss 3203, a connection hole 3204 accommodating the boss 3203, and an annular welding spot 3217 located between the boss 3203 and the connection hole 3204, thereby ensuring effective passing of a high current. Specifically, as shown in FIG. 23, different from what is shown in FIG. 6, the boss 3203 is formed in the flipping member 3202 while the connection hole 3204 is formed in the conductive member 3201. In addition, alternatively, a case that is the same as FIG. 6 may be used, that is, the boss is formed in the conductive member 3201, and the connection hole 3204 is formed in the flipping member.

Figure 22:
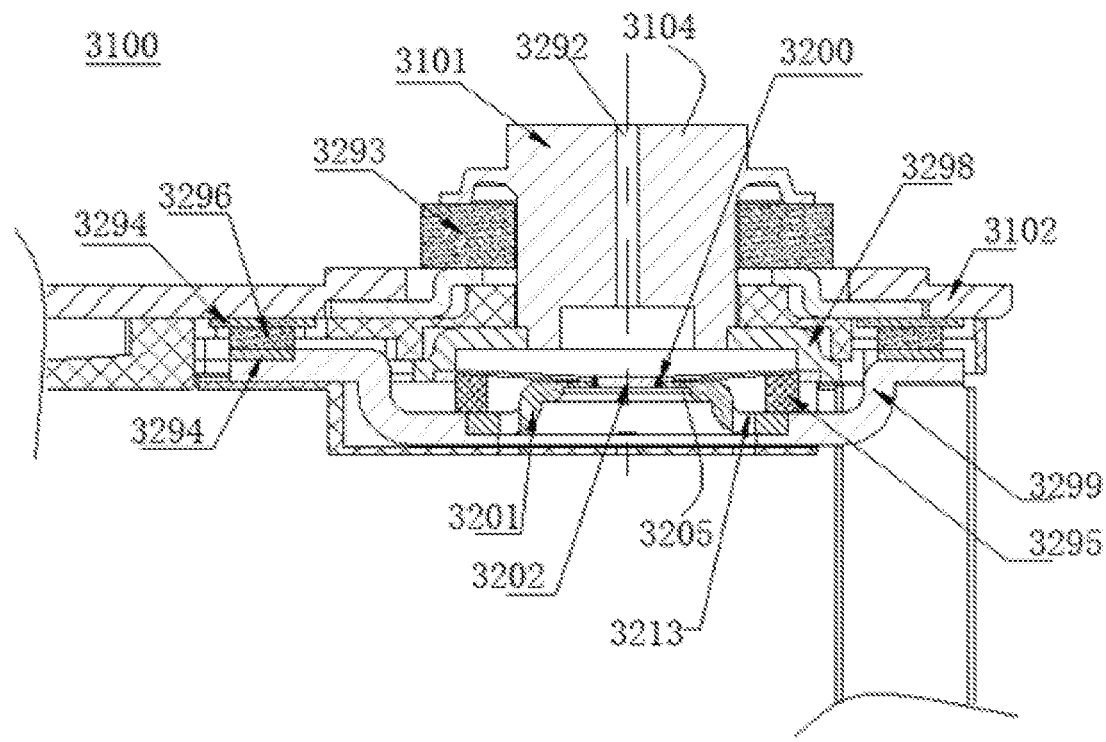
FIG. 22 is a partial schematic structural sectional view of a single-cell battery according to an embodiment of the present disclosure.

Moreover, as shown in FIG. 22, the conductive member 3201 may be formed in a cap-shaped structure. The cap-shaped structure includes a cap body connected to the flipping member and a cap brim surrounding the cap body. The cap brim includes the air-guide hole and is connected to the internal guide member. The cap body protrudes towards the flipping member. The flipping member is formed with a sheet-like structure, and the insulation member 3295 is connected between an outer periphery of the sheet-like structure and the cap brim. Therefore, the structure of the current interruption device provided in the present disclosure is compact, and assembling is stable.

In this embodiment, to establish a current loop to the outside, preferably, the electrode terminal 3101 includes a battery post 3104 passing through the cover plate. The battery post is in insulated connection with the cover plate by using the ceramic ring 3293, thereby preventing the cover plate from being electrified. Moreover, the adaptor portion 3298 is connected to an inner end of the battery post to establish a current loop to the outside by using a part protruding out of the cover plate. Specifically, the ceramic ring 3293 is tightly connected to an outer surface of the cover plate and is tightly connected to the battery post 3104, to ensure a sealing effect inside the cover plate. An air hole 3292 is formed through the battery post along an axial direction. In this way, in a process of disconnection under pressure, the current interruption device 3200 is not affected by air pressure of a closed cavity in the cover plate but can have a pressure difference with the outside atmospheric air, so that the flipping member 3202 can make a movement under action of the pressure difference between the internal pressure and the external pressure to pull the notch 3205 apart.

Figure 24:
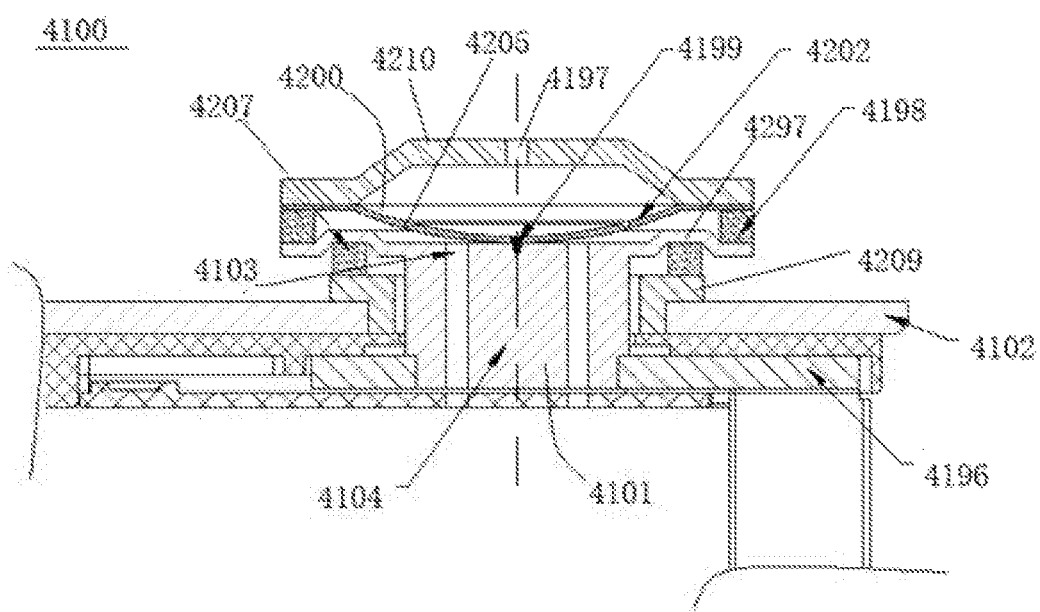
FIG. 24 is a partial schematic structural sectional view of a single-cell battery according to an embodiment of the present disclosure.

The single-cell battery provided in the embodiments according to FIG. 22 and FIG. 23 is described above. The following describes an embodiment of the present disclosure with reference to FIG. 24.

This embodiment provides a single-cell battery 4100 and a battery module using the single-cell battery. The single-cell battery 4100 includes a case, a battery cell accommodated in the case, an electrode terminal 4101 electrically connected to the battery cell, and a cover plate 4102 for sealing the case. The electrode terminal 4101 is disposed on the cover plate 4102. The electrode terminal includes a battery post 4104 passing through the cover plate 4102 and electrically connected to the battery cell by using an internal guide member 4196. The single-cell battery further includes a current interruption device 4200 mounted on the battery post 4104. The current interruption device 4200 has a flipping member 4202 that is fixed relative to the cover plate 4102 and that is in communication with gas inside the case. In addition, the flipping member 4202 is connected to an outer end surface of the battery post 4104 by using a connection point. The connection point can be disconnected under action of air pressure. In this way, the operating principle of the current interruption device in this implementation is to directly separate the flipping member 4202 from the battery post 4104 at the connection point with the air pressure, thereby disconnecting the electrical connection between the flipping member 4202 and the battery post 4104.

To improve sensitivity, preferably, the flipping member 4202 is connected to the battery post by using a single welding spot 4199. For example, the welding spot 4199 created with spot welding is used. In addition, another welding means such as laser welding may be used for implementation. Therefore, in this implementation, weld penetration and weld width of the welding spot are properly set, to control tensile pressure.

In this implementation, similar to the embodiments according to FIG. 1 to FIG. 12, the battery post 4104 includes an air-guide hole 4103 in communication with the inner part of the case, so that the internal air pressure can be easily guided to the current interruption device. Moreover, to further improve reliability of the current interruption device, preferably, the flipping member 4202 includes a notch 4205. The notch 4205 is disposed surrounding a connection point. In this way, in addition to pulling apart the connection point, pulling the notch 4205 apart may also be used to interrupt a current. In this implementation, the air pressure for pulling apart the connection point is different from air pressure for pulling apart the notch. Specifically, the connection point can be pulled apart under action of first air pressure inside the case, and the notch 4205 can be pulled apart under action of second air pressure. The second air pressure is greater than the first air pressure. In this way, the notch 4205 can be used as a backup measure of the connection point, to ensure battery safety. More preferably, the flipping member 4202 is covered by a covering cap 4210. The covering cap 4210 includes an air hole 4197. In this way, after the notch 4205 is pulled apart, the gas inside the case passes through the flipping member and is then discharged from the air hole 4197, thereby implementing pressure relief inside the battery, and preventing explosions inside the battery. This principle is similar to that of the explosion relief valve in the embodiment according to FIG. 18.

In this implementation, a first ceramic ring 4207 is connected between the battery post 4104 and the cover plate 4102, so that the battery post is stably mounted by using the ceramic structure and the cover plate 4102 is prevented from being electrified. Moreover, a second ceramic ring 4198 is tightly connected between the battery post 4104 and an outer periphery of the flipping member, so that the outer periphery of the flipping member can be sealed by using the ceramic structure, thereby ensuring that the internal gas can effectively apply pressure to the flipping member and that the battery post is insulated from the outer periphery of the flipping member, and preventing the flipping member from being still conductive after the connection point or the notch is pulled apart.

Specifically, in an embodiment, the battery post 4104 has an annular boss 4297 surrounding the connection point. The first ceramic ring 4207 is tightly accommodated in a rear concave portion of the annular boss 4297. The first ceramic ring 4207 is tightly connected to the cover plate 4102. A radial outer side of the annular boss 4297 tightly supports the second ceramic ring 4198. The second ceramic ring 4198 tightly supports the outer periphery of the flipping member 4202. In this way, the overall structure of the current interruption device is more compact, and the assembling is stable. For ease of assembly, the first ceramic ring 4207 is tightly connected to the cover plate 4102 by using a transition ring 4209. Specifically, ceramic brazing may be performed on the transition ring and the first ceramic ring 4207 for the tight connection.

Some embodiments of the present disclosure are described above. The following describes an embodiment of the present disclosure with reference to FIG. 5 to FIG. 7, FIG. 20, and FIG. 21. This embodiment provides a single-cell battery and a battery module. Effects of features that are the same as those in the foregoing embodiments are not described in detail herein again.

This embodiment provides a single-cell battery. The single-cell battery 100 includes a case 109, a battery cell 108 accommodated in the case 109, an electrode terminal 101 electrically connected to the battery cell 108, and a cover plate 102 for sealing the case. The electrode terminal 101 is disposed on the cover plate 102. The electrode terminal includes a battery post 104''' passing through the cover plate 102 and electrically connected to the battery cell. The single-cell battery further includes a current interruption device 200 mounted on the battery post 104'''. The current interruption device 200 is in communication with gas inside the case. The current interruption device 200 has a conductive member 201 and a flipping member 202 connected to the conductive member 201 for mutual electrical connection. In addition, the flipping member 202 and the conductive member 201 can be electrically disconnected from each other under action of air pressure. The conductive member 201 is connected to the battery post 104''' for mutual electrical connection. The flipping member 202 and the conductive member 201 are connected to each other by using a boss welded structure. The boss welded structure includes a boss 203, a connection hole 204 accommodating the boss 203, and an annular welding spot 217 located between the boss 203 and the connection hole 204. The flipping member 202 is formed with a first sheet-like structure. The first sheet-like structure includes the connection hole 204. The conductive member 201 is formed with a second sheet-like structure. The second sheet-like structure includes the boss 203. The conductive member 201 includes a notch 205. The notch 205 is disposed surrounding the boss 203. The conductive member 201 is connected to an outer end surface of the battery post 104'''. An outer periphery of the flipping member 202 is fixed relative to the cover plate 102. The battery post 104''' is fixedly connected to the cover plate 102, and the battery post 104''' includes an air-guide duct communicating an inner part of the case and the current interruption device 200. The battery post 104''' is mounted in a ceramic ring 207" tightly connected to the cover plate 102. An outer end surface of the ceramic ring 207" is tightly connected to a conductive ring 216'. The outer periphery of the flipping member 202 is tightly connected to the conductive ring 216'. The battery post 104''' and the conductive ring 216' are insulted by using the ceramic ring 207". In this way, a current is stably transmitted or interrupted.

In this embodiment, the outer end surface of the battery post 104''' includes an accommodation hole 218', and an outer periphery of the conductive member 201 is fixed to an inner wall of the accommodation hole.

In this embodiment, the notch 205 is elliptical, the boss 203 is circular, a center of the notch 205 and a center of the boss 203 are staggered along a direction of major axis of the ellipse, and the major axis of the ellipse and an axial line of the electrode terminal are obliquely disposed.

In this embodiment, in addition, an outer end periphery of the battery post 104''' has a radial boss 105". An inner periphery of the ceramic ring 207" has a radial support 208" supporting and connected to the radial boss 105". There are multiple radial bosses 105" disposed at intervals along a circumferential direction. There are multiple radial supports 208" disposed at intervals along the circumferential direction. The multiple radial bosses are in a one-to-one correspondence with the multiple radial supports.

In this embodiment, the outer end surface of the ceramic ring 207" is formed in a stepped structure having an inner ring and an outer ring. The battery post 104''' is in embedded connection with the inner ring. The outer ring is tightly connected to the conductive ring 216' insulated from the battery post 104'''. The outer periphery of the flipping member 202 is fixedly connected to the conductive ring 216'. An inner end surface of the ceramic ring 207" is tightly connected to a transition ring 209'. The transition ring 209' is tightly connected to the cover plate 102 so that the ceramic ring 207" and the cover plate 102 are disposed at intervals.

In this embodiment, the ceramic ring 207" is tightly connected to the conductive ring 216', the battery post 104''', and the transition ring 209' with ceramic brazing.

In this embodiment, the transition ring 209' has an inner ring and an outer ring that form a Z-shaped structure. The cover plate includes a through hole through which the battery post 104 passes. An end surface of the through hole is in a staircase structure. The inner ring of the transition ring is embedded in and supports the staircase structure.

In this embodiment, the outer end surface of the conductive ring 216' includes an L-shaped rabbet. The outer periphery of the flipping member 202 is embedded in and supports the L-shaped rabbet. The outer periphery is tightly connected to the L-shaped rabbet by using a covering cap 210 covering the flipping member 202.

Figure 20:
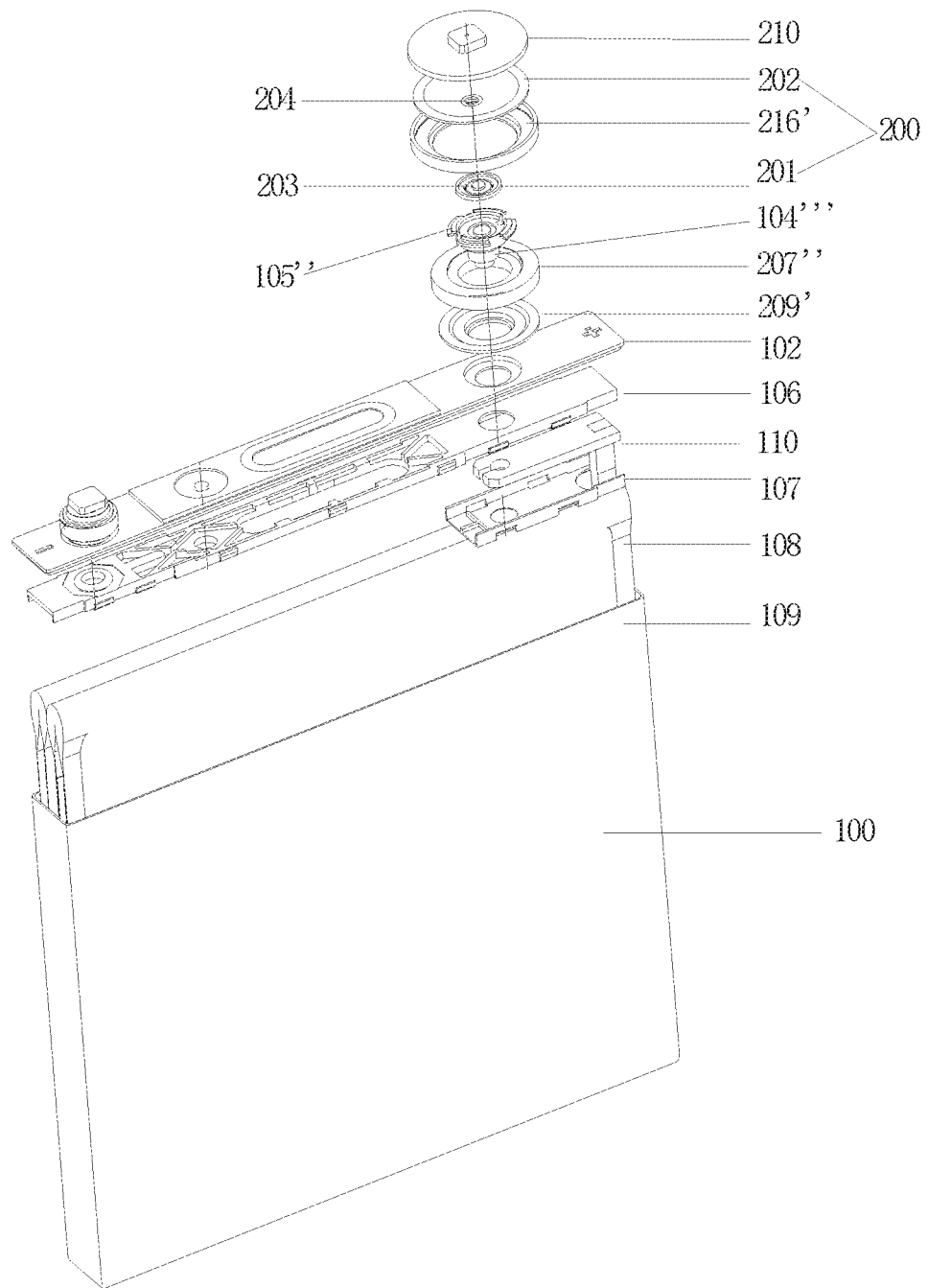
FIG. 20 is an exploded schematic structural diagram of a single-cell battery according to an embodiment of the present disclosure.
Figure 21:
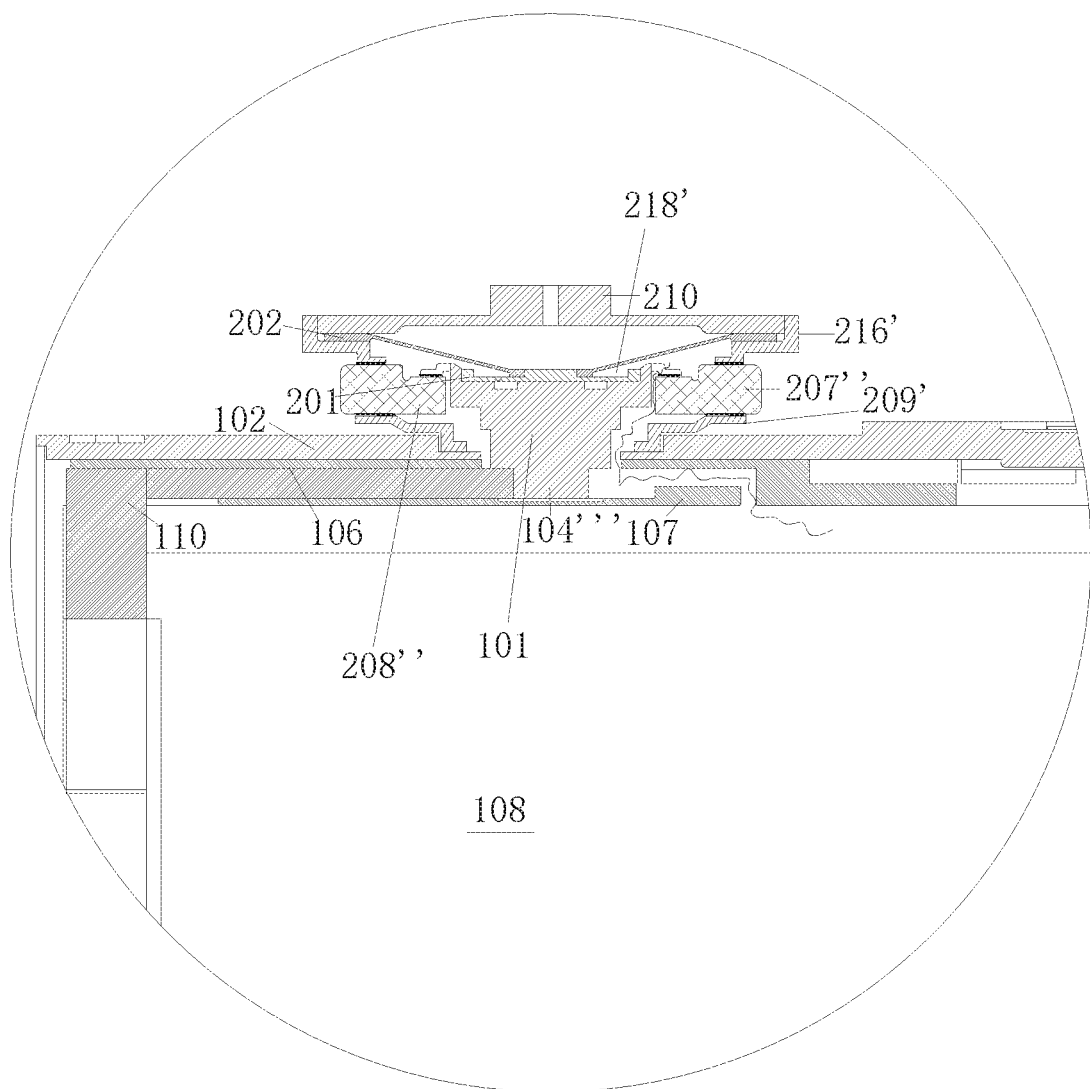
FIG. 21 is a partial schematic structural sectional view of the single-cell battery in FIG. 20 after assembling.

To implement assembling of the single-cell battery, as shown in FIG. 20 and FIG. 21, a lower spacer ring 107 is connected to the battery cell 108, and an upper spacer ring 106 is connected below the cover plate 102. The upper and lower spacer rings may be made of an insulating material. The single-cell battery 100 further includes an internal connecting sheet 110 connected to the battery cell. The internal connecting sheet 110 extends to between the upper spacer ring 107 and the lower spacer ring 106. A lower surface of the battery post 104''' includes a staircase portion. The staircase portion passes through the cover plate 102 and the upper spacer ring 106 and is clipped to an end portion of the internal connecting sheet 110. In this way, the current is transmitted from the battery cell 108 to the battery post 104''', and the cover plate 102 is insulated from the case 109 and prevented from being electrified.

According to a battery module provided in this embodiment, the battery module includes multiple single-cell batteries. At least one of the single-cell batteries is the single-cell battery described above. The current interruption device 200 extends out of the cover plate 102 along a radial direction. Between adjacent single-cell batteries 100, the current interruption device 200 and an adjacent electrode terminal are staggered in a direction of extension of the cover plate. Moreover, as shown in FIG. 1, between the adjacent single-cell batteries 100, the current interruption device 200 is connected to the adjacent electrode terminal by using an L-shaped connecting member 214. The L-shaped connecting member 214 has a cover portion 211 and a guide portion 212. The cover portion 211 covers and is connected to the current interruption device 200. The guide portion 212 extends to the adjacent electrode terminal.

In addition, this embodiment further provides a power battery. The power battery includes an inclusion body and a battery module accommodated in the inclusion body. The battery module is the battery module described above. A gas detection device for detecting flammable gas is disposed inside the inclusion body. The gas detection device is disposed close to the current interruption device, to provide a flammable gas signal for a charge/discharge protection system. Moreover, considering costs and the effect, the battery module needs to have only one current interruption device.

The single-cell battery having a current interruption device or an explosion relief valve is described above. The current interruption device or the explosion relief valve each implements safety measures by using a mechanical structure of the current interruption device or the explosion relief valve. The following describes in detail a power battery including a charge/discharge protection system, to improve safety with electrical control.

Figure 19:
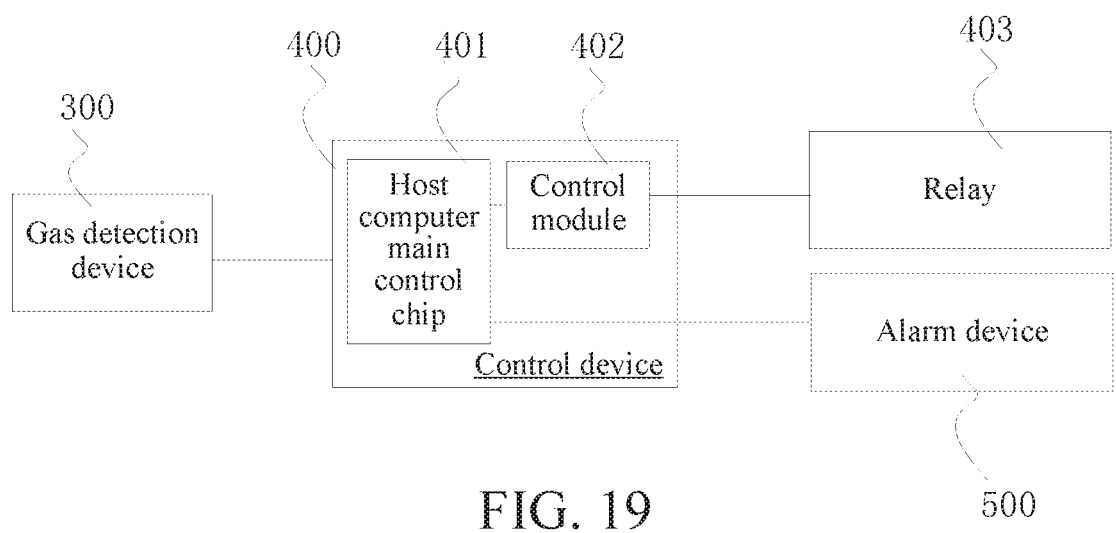
FIG. 19 is a principle block diagram of a control system according to an embodiment of the present disclosure.

As shown in FIG. 19, the present disclosure provides a power battery. The power battery may be a power battery having a current interruption device or an explosion relief valve, or another type of power battery. The power battery includes an inclusion body and multiple single-cell batteries 100 accommodated in the inclusion body. For example, the multiple single-cell batteries 100 may be connected in series or in parallel to form a battery module. A gas detection device 300, for example, a gas sensor, for detecting flammable gas in the power battery is disposed inside the inclusion body, to provide a signal for indicating whether to switch off a charge/discharge circuit of the power battery.

In addition to including the gas detection device 300 located inside the power battery, the charge/discharge protection system included in the power battery further includes a control device 400 and a circuit switching on/off device.

The gas detection device 300 feeds back a flammable gas signal to the control device 400. The control device 400 is configured to control, according to the flammable gas signal, the circuit switching on/off device to switch off the charge/discharge circuit of the power battery control. That is, safety of the present disclosure is automatic control performed by detecting whether there is flammable gas in the inclusion body. In an emergency state such as overcharging of the battery, flammable gas is produced inside the battery. The part of gas more or less leaks to the inner part of the inclusion body in various manners. In this case, the gas detection device, for example, the gas sensor, can detect the flammable gas, and feeds back such information to the control device. The control device determines, according to whether flammable gas is detected or an amount of detected flammable gas, whether to disconnect the charge/discharge circuit of the power battery. When flammable gas is detected, or an amount of flammable gas exceeds a preset threshold, the circuit switching on/off device may be controlled to disconnect the charge/discharge circuit of the power battery, ensure safety of the power battery.

To further reduce potential risks, the power battery further includes an alarm device 500 controlled by the control device 400. In this way, relevant personnel may be instructed, with voice, flash, or a alarm device such as a siren, to evacuate the site, thereby reducing potential risks.

As shown in FIG. 19, the control device 400 includes a host computer main control chip 401 of the power battery and a control module 402 in signal connection with the main control chip. The control module 402 is in signal connection with the circuit switching on/off device. The circuit switching on/off device may be a relay 403 located in the charge/discharge circuit, to be controlled by the control module 402 to switch off the charge/discharge circuit. Moreover, the alarm device 500 may be in signal connection with the host computer control chip 401, to receive an alarm from an alarm instruction.

In a specific operating process, digital-to-analog conversion, sampled storage, and other processing may be performed on an acquired signal of the gas sensor. Moreover, fault detection may further be performed on the system. When no failure occurs in the system, gas concentration processing may further be performed on the acquired signal, to determine whether leakage of flammable gas occurs. When the concentration of the leakage of the flammable gas exceeds a threshold, the host computer main control chip 401 performs operations of interrupting the current and alarming.

In this implementation, the gas detection device is disposed outside the single-cell battery. The flammable gas may be discharged to the outside by using the current interruption device or the explosion relief valve in the foregoing implementations of the present disclosure. In addition, various known conventional explosion relief valves may be used to discharge the gas to the outside provided that the valves are capable of discharging the gas to the outside. That is, in the battery module, at least one of the single-cell batteries includes a current interruption device for disconnecting the charge/discharge circuit under action of gas pressure inside the single-cell battery, that is, the foregoing current interruption device. In addition, the current interruption device can enable gas inside a case to be discharged to the outside in a disconnected state. In this way, the gas detection device in the inclusion body can detect the flammable gas discharged to the outside. In this case, it indicates that an emergency case of overcharging of the battery occurs. In addition, to improve sensitivity of the system, preferably, the gas detection device is disposed close to the current interruption device, so that the gas detection device can detect a corresponding signal in a timely manner after the flammable gas is released, and feeds back the signal to the control device. Moreover, in addition to the current interruption device, in some implementations, at least one of the single-cell batteries includes an explosion relief valve capable of discharging gas under action of gas pressure inside the single-cell battery, for example, the explosion relief valve in the embodiment according to FIG. 18. In this case, the gas detection device may be disposed close to the explosion relief valve.

To discharge the gas to the outside, the current interruption device in each of the foregoing implementations includes a cover member. The cover member includes an air hole in communication with the outside. In this way, the gas inside the case can be discharged to the outside by using the flipping member after the flipping member and a conductive member are electrically disconnected from each other. Specifically, in this case, the flipping member may be provided with a notch that can be pulled apart by the air pressure inside the case. In the embodiments according to FIG. 13 to FIG. 17, compressive strength of the notch in the flipping member may be greater than strength of the notch in the body portion of the conductive member. Alternatively, in the embodiment according to FIG. 18, compressive strength of the notch in the flipping member may be greater than strength of the notches in the two electrode guide members. In this way, a process of releasing gas after a current is interrupted is implemented. In addition, if the current interruption device in the embodiments according to FIG. 1 to FIG. 12 is used, the flipping member includes the foregoing notch.

Moreover, the air hole in the cover member may further enable the current interruption device to have a pressure difference with the atmospheric air, so that an action of the flipping member is implemented. The cover member herein may be the covering cap 210 in the embodiments according to FIG. 1 to FIG. 12, or may be the connecting member 1210 in the embodiments according to FIG. 13 to FIG. 17, or the protective film 2099 in the embodiment according to FIG. 18, or the like. In this way, after the corresponding notch is pulled apart, the gas can be discharged to the outside by using, for example, the air hole 213 in the embodiments according to FIG. 1 to FIG. 12, so that the gas detection device can detect in a timely manner flammable gas that leaks to the pack.

The embodiments of the present disclosure are described in detail with reference to the accompanying drawings. However, the present disclosure is not limited to the specific details in the foregoing embodiments. Various simple variations may be made to the technical solutions of the present disclosure within the technical idea of the present disclosure. These simple variations all fall within the protection scope of the present disclosure.

Moreover, it should be noted that, the specific technical features described in the foregoing specific embodiments may be combined in any appropriate manner when there is no contradiction. To avoid unnecessary repetitions, possible combination manners are not additionally described in the present disclosure.

In addition, the different embodiments of the present disclosure may be randomly combined, and the combinations may also be considered as content disclosed by the present disclosure provided that the combinations do not depart from the idea of the present disclosure.

Finally, the research and development background for introducing the foregoing inventive ideas of the present disclosure are described.

Environmental pollution increasingly deteriorates, development of new energy vehicles become a new national strategic plan. Currently, all-electric vehicles and plug-in hybrid vehicles of the new energy vehicles dominate the automobile market. In the field of electric vehicles, the endurance mileage is a main factor restricting the development of the electric vehicles, and the endurance mileage depends on energy density of a battery cell. Currently, there are mainly two materials: a ternary material and Lithium iron phosphate for battery cells in the market. Although with high energy density, the ternary material is poor in safety performance. Particularly, overcharging causes fires or explosions. This is a great challenge for the automotive industry having strict requirements on safety performance.

As a greater battery capacity leads to better endurance mileage, some solutions to improvement of the safety performance of the ternary material need to be used to ensure safety of the ternary. However, because it is difficult to further improve the performance of the material, a solution relating to structures needs to be considered.

As described in the related art, in the existing design of a battery pack, a BMS is mainly used to perform voltage and current temperature management and control on a battery cell in a module. However, in an actual use process, there are still incidental risks of consistency of the battery cell and reliability of management software. Specifically, referring to people's usage habits with regard to mobile devices, the people usually plug in car bodies to recharge the electric vehicles all the time. Because the BMS software is used to control the recharging, such batteries are merely recharged for a long time. However, if software detection fails or another exception occurs, a risk of overcharging of a battery cell in a loop in an inclusion body occurs. Therefore, the author of the present disclosure conceives of a design for providing mechanical protection for a battery, to prevent a battery safety risk from occurring after a software failure.

For mechanical protective measures, the author of the present disclosure creatively finds that there is a law of current interruption timing of a battery in an emergency state such as overcharging. To be specific, a current interruption device or an explosion relief valve capable of interrupting a current on an electrode terminal can be designed according to the principle that internal air pressure increases in an emergency state such as overcharging. In this way, inputting or outputting through the electrode terminal can be controlled, thereby ensuring safety.

Moreover, a capacity of a power battery used in an automobile is usually ten-odd times of that of a 3C battery, and a through current the power battery is dozens or even hundreds of times of that of a minor class of battery. Therefore, the power battery further needs to withstand a very high through current. In addition, requirements on weather resistance and leak tightness of the power battery are stricter because of a usage environment. These problems are collected and then the technical solutions of the present disclosure are formed. In addition, as verified by tests, the current interruption device or the explosion relief valve in any of the implementations of the present disclosure can interrupt a current in a battery in a timely manner, thereby effectively improving safety.

What is claimed is:

1. A single-cell battery, comprising:
   a case;
   a battery cell accommodated in the case;
   an electrode terminal electrically connected to the battery cell;
   a cover plate for sealing the case, wherein the electrode terminal is disposed on the cover plate, and the electrode terminal comprises a battery post passing through the cover plate and electrically connected to the battery cell with an internal guide member;
   a connection plate coupled with the battery post, the connection plate having a boss disposed on the connection plate; and
   a current interruption device disposed on the connection plate and mounted on the battery post, the current interruption device comprising a flipping member in communication with gas inside the case, wherein the flipping member comprises a hole to receive the boss of the connection plate and is connected to an outer end surface of the boss with a connection point, and wherein the connection point is configured to be disconnected under action of air pressure.

2. The single-cell battery according to claim 1, wherein the connection point includes a single welding spot.

3. The single-cell battery according to claim 1, wherein the battery post includes an air-guide hole in communication with an inner part of the case.

4. The single-cell battery according to claim 1, wherein the flipping member includes a notch, and the notch is disposed surrounding the connection point.

5. The single-cell battery according to claim 4, wherein the connection point is configured to be pulled apart under action of first air pressure inside the case, the notch is configured to be pulled apart under action of second air pressure, and the second air pressure is greater than the first air pressure.

6. The single-cell battery according to claim 4, wherein the flipping member is covered by a covering cap, and the covering cap includes an air hole.

7. The single-cell battery according to claim 1, wherein a first ceramic ring is connected between the battery post and the cover plate.

8. The single-cell battery according to claim 1, wherein a second ceramic ring is connected between the battery post and an outer periphery of the flipping member.

9. The single-cell battery according to claim 1, wherein the battery post includes an annular boss surrounding the connection point, a first ceramic ring is accommodated in a rear concave portion of the annular boss, the first ceramic ring is connected to the cover plate, a radial outer side of the annular boss supports a second ceramic ring, and the second ceramic ring supports the outer periphery of the flipping member.

10. The single-cell battery according to claim 9, wherein the first ceramic ring is connected to the cover plate with a transition ring.

11. A battery module comprising a single-cell battery, wherein the single-cell battery comprises:
    a case;
    a battery cell accommodated in the case;
    an electrode terminal electrically connected to the battery cell;
    a cover plate for sealing the case, wherein the electrode terminal is disposed on the cover plate, and the electrode terminal comprises a battery post passing through the cover plate and electrically connected to the battery cell with an internal guide member;
    a connection plate coupled with the battery post, the connection plate having a boss disposed on the connection plate; and
    a current interruption device disposed on the connection plate and mounted on the battery post, the current interruption device comprising a flipping member in communication with gas inside the case, wherein the flipping member comprises a hole to receive the boss of the connection plate and is connected to an outer end surface of the boss with a connection point, and wherein the connection point is configured to be disconnected under action of air pressure.

12. A power battery, comprising an inclusion body and a battery module disposed inside the inclusion body, wherein the battery module is the battery module according to claim 11.

13. An electric vehicle, wherein the electric vehicle includes the power battery according to claim 12.

14. The battery module according to claim 11, wherein the battery post includes an air-guide hole in communication with an inner part of the case.

15. The battery module according to claim 11, wherein the flipping member includes a notch, and the notch is disposed surrounding the connection point.

16. The battery module according to claim 15, wherein the connection point is configured to be pulled apart under action of first air pressure inside the case, the notch is configured to be pulled apart under action of second air pressure, and the second air pressure is greater than the first air pressure.

17. The battery module according to claim 15, wherein the flipping member is covered by a covering cap, and the covering cap includes an air hole.

18. The battery module according to claim 11,
wherein a first ceramic ring is connected between the battery post and the cover plate, or
a second ceramic ring is connected between the battery post and an outer periphery of the flipping member.

19. The battery module according to claim 11, wherein the battery post includes an annular boss surrounding the connection point, a first ceramic ring is accommodated in a rear concave portion of the annular boss, the first ceramic ring is connected to the cover plate, a radial outer side of the annular boss supports a second ceramic ring, and the second ceramic ring supports the outer periphery of the flipping member.

20. The battery module according to claim 19, wherein the first ceramic ring is connected to the cover plate with a transition ring.

* * * * *